(12) United States Patent
Ohashi

(10) Patent No.: US 6,353,506 B1
(45) Date of Patent: Mar. 5, 2002

(54) COMPACT ZOOM LENS AND A CAMERA USING THE ZOOM LENS

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 18 days.

(21) Appl. No.: 09/640,655

(22) Filed: Aug. 18, 2000

(30) Foreign Application Priority Data

Aug. 19, 1999 (JP) .......................................... 11-232663

(51) Int. Cl.$^7$ ................................................ G02B 15/14
(52) U.S. Cl. ........................ 359/687; 359/684; 359/685
(58) Field of Search ................................ 359/687, 685, 359/683, 684, 676

(56) References Cited

U.S. PATENT DOCUMENTS

| | | | |
|---|---|---|---|
| 4,437,732 A | * 3/1984 | Ishiyama | 359/685 |
| 4,515,446 A | * 5/1985 | Takahashi et al. | 359/686 |
| 4,659,189 A | * 4/1987 | Kitagishi | 359/687 |
| 5,301,064 A | * 4/1994 | Sugi et al. | 359/684 |
| 5,398,135 A | 3/1995 | Ohashi | 359/692 |
| 5,576,891 A | 11/1996 | Ohashi | 359/692 |
| 5,617,254 A | 4/1997 | Ohashi | 359/692 |
| 5,687,401 A | 11/1997 | Kawamura et al. | 396/79 |

* cited by examiner

*Primary Examiner*—Jordan M. Schwartz
(74) *Attorney, Agent, or Firm*—Oblon, Spivak, McClelland, Maier & Neustadt, P.C.

(57) ABSTRACT

A camera includes a zoom lens having a first lens group having a positive focal length, a second lens group having a negative focal length, an opening iris, a third lens group having a positive focal length, and a fourth lens group having a positive focal length. The first lens group, the second lens group, the opening iris, the third lens group and the fourth lens group are arranged in order from the object side, When zooming from a short focal point end toward a long focal point end, the second lens group moves from the object side toward the image side, and the third lens group first moves from the image side toward the object side, and then, after arriving at a position closest to the object side in an area at a long focal point side beyond an intermediate focal point, moves toward the image side.

18 Claims, 28 Drawing Sheets example 1 example 2 example 3 example 4 example 5 example 1:intermediate focal length)

example 1: long focal point end example 2: long focal point end example 3: intermediate focal length example3: long focal point end example 4: intermediate focal length example 5: intermediate focal length example 5: long focal point end

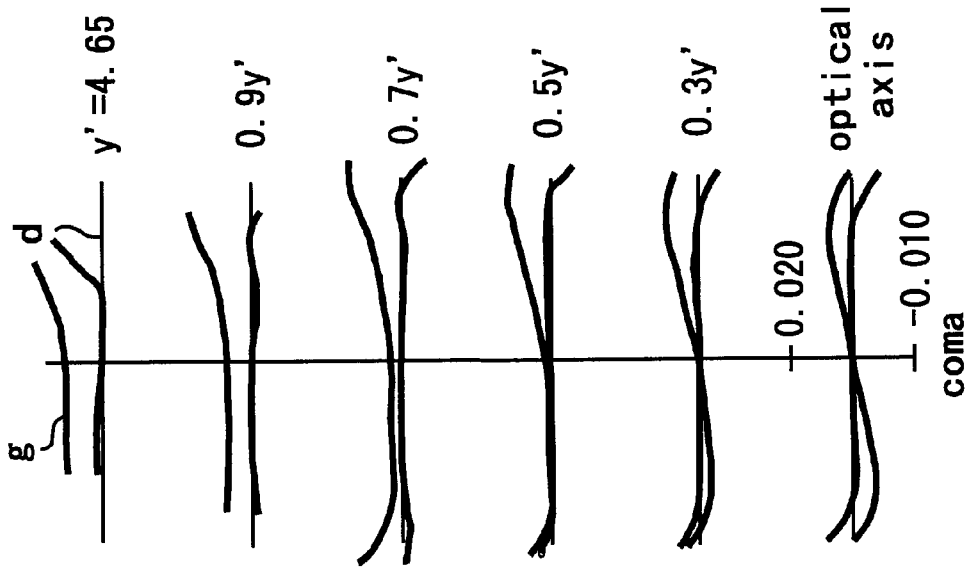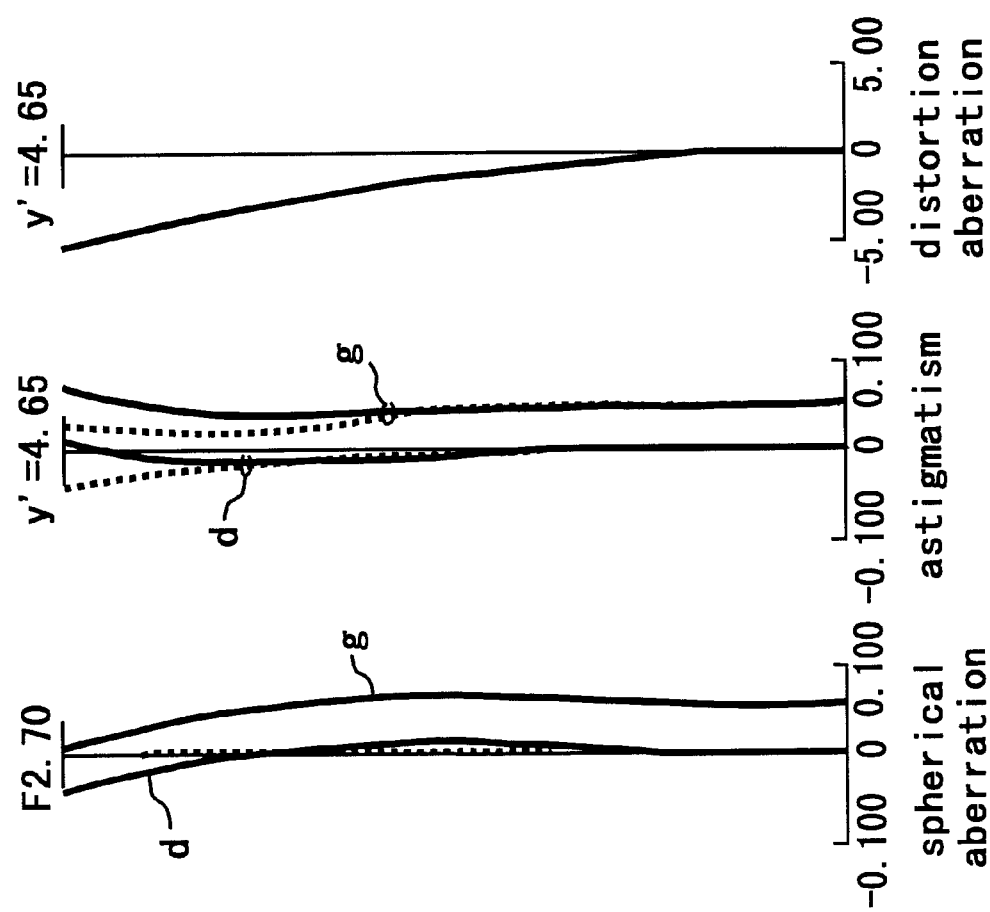
FIG. 24

COMPACT ZOOM LENS AND A CAMERA USING THE ZOOM LENS

BACKGROUND OF THE INVENTION

1. Field of the Invention

The present invention relates to a zoom lens for use in cameras such as silver halide cameras, digital cameras and video cameras.

2. Discussion of the Background

With the increased spread of personal computers in recent years, the use of digital cameras as an information capturing device to capture image information for inputting into the personal computers has also widely spread.

Among various desires of the users for digital cameras, those for enhancing the image quality, for increasing the magnification, and for reducing the size and the power consumption of the cameras are strong. For satisfying such desires of the users, the photographing lens of digital cameras must have a zooming function, and at the same time, the photographing lens must be able to realize a high image quality corresponding to a resolution of a light receiving element, such as one having more than three million pixels, and that can realize the high magnification and the reduced size as well.

Also, it is preferable that a short distance focusing is possible for the sake of a user's convenience. Specifically, it is desired that a relatively small area can be photographed in a short distance while keeping a high magnification.

A zoom lens suitable for being made compact is known that includes a first lens group having a positive focal length, a second lens group having a negative focal length, a third lens group having a positive focal length and a fourth lens group having a positive focal length. When zooming from a short focal point end toward a long focal point end using such a zoom lens, the second lens group monotonously moves from the object side toward the image side for changing the magnification, the third lens group monotonously moves from the image side toward the object side, and the focusing is accomplished by a movement of the fourth lens group. In this type of zoom lens, an auxiliary function of changing the magnification is performed by the third lens group, so that the moving distance of the second lens group for changing the magnification is small and the distance from the first lens group to the opening iris is shortened. Thereby, the lens diameter of the first lens group can be small. Examples of such zoom lenses are described, for example, in Japanese Patent Laid-open Publications No. 06-94997, No. 06-194572, No. 10-062687, and No. 11-119100.

In the zoom lenses described in JP No. 06-94997, No. 06-194572 and No. 11-119100, when zooming, the fourth lens group is required to be moved in order to keep the position of an object plane constant. That is, when zooming, at least three lens groups have to be moved. Accordingly, a plurality of driving actuators for zooming are needed, and further, a relatively large torque is needed for driving a cam that is used for moving the lens groups, which increases the power consumption.

Further, in actual products, because of variations in the dimensions of parts, if each lens group is disposed according the design, the object plane may deviate from the designed position when zooming. Such deviation of the object plane is avoided by adjusting the criterion positions of the lens groups when the products are assembled. Generally, the criterion positions of two lens groups are adjusted so that the object plane at the short focal point end coincides with the one at the long focal point end. If there exist more than three lens groups that are moved when zooming, when making the above adjustment, the lens group which is not used for the adjustment is also required to be moved, which undesirably increases the number of steps of assembling the products.

JP No. 06-194572 describes a zoom lens that can focus on an object substantially at a tip of the lens at the short focal point end. However, this is because the interval between the third lens group and the fourth lens group at the short focal point end when the focusing is made on an infinite distance is made sufficiently large such that the moving distance for focusing can be easily obtained. Therefore, if the size of the zoom lens is desired to be reduced, particularly if the total length of the zoom lens is desired to be reduced, the interval between the third lens group and the fourth lens group when the focusing is made on an infinite distance cannot be necessarily made sufficiently large so that the moving distance for focusing can be easily obtained. Accordingly, even if focusing is performed by movement of the fourth lens group, focusing cannot always be possible on an object at a tip end of the lens at the short focal point end.

In a zoom lens described in JP No. 10-062687, the focusing in the normal photographing area is performed by moving the fourth lens group and the focusing in a shorter distance is performed by moving the second lens group as well as moving the fourth lens group. That is, a plurality of lens groups are driven by a focusing signal from a distance measuring device, which undesirably complicates the driving mechanism.

SUMMARY OF THE INVENTION

The present invention has been made in view of the above-discussed and other problems, and addresses the above-discussed and other problems.

Preferred embodiments of the present invention provide a novel zoom lens and a camera using the zoom lens, that are compact and are capable of photographing a high quality image, and that are also superior in reducing the power consumption and that can be easily adjusted when assembled.

Preferred embodiments of the present invention further provide a novel zoom lens having a macro mode capable of focusing on a distance shorter than a normal photographing area and a camera using the zoom lens, that are suitable for being made compact and in which the macro mode mechanism is relatively simple.

According to a preferred embodiment of the present invention, a zoom lens includes a first lens group having a positive focal length; a second lens group having a negative focal length; an opening iris; a third lens group having a positive focal length; and a fourth lens group having a positive focal length. The first lens group, the second lens group, the opening iris, the third lens group and the fourth lens group are arranged in order from the object side. When zooming from a short focal point end toward a long focal point end, the second lens group monotonously moves from the object side toward the image side, and the third lens group first moves from the image side toward the object side and then, after arriving at a position closest to the object side in an area at a long focal point side beyond an intermediate focal point, moves toward the image side.

In the above zoom lens, the fourth lens group may be fixed when zooming. Further, the opening iris may be always fixed. Furthermore, the first lens group may be always fixed.

Further, in the above zoom lens, focusing can be achieved by a movement of the fourth lens group.

Furthermore, a focal length of the first lens group, $f_1$, and a synthesized focal length of the first lens group and the second lens group at the long focal point end, $f_{12T}$, may preferably satisfy a condition:

$$-1.2 < (f_{12T}/f_1) < -1.0$$

Still furthermore, the synthesized focal length of the first lens group and the second lens group at the long focal point end, $f_{12T}$, a synthesized focal length of the first lens group and the second lens group at the short focal point end, $f_{12W}$, a synthesized focal length of the first lens group through the third lens group at the long focal point end, $f_{123T}$, and a synthesized focal length of the first lens group through the third lens group at the short focal point end, $f_{123}$, W preferably satisfy a condition:

$$1.3 < (f_{123T}/f_{12T})/(f_{123W}/f_{12W}) < 1.5$$

Also, each of the first through fourth lens groups preferably includes three or less lenses, and each of the second, third and fourth lens groups preferably includes at least one non-spherical surface.

According to another preferred embodiment of the present invention, the zoom lens includes a macro mode in which focusing is achieved on a shorter distance than in a normal photographing area. In the normal photographing area focusing is achieved by a movement of the fourth lens group. In the macro mode, the second and third lens groups are disposed in a positional relationship that is different from when zooming, and in the macro mode focusing is achieved by a movement of the fourth lens group.

In the above zoom lens, a position of the third lens group in the macro mode may be made so as to substantially coincide with a position of the third lens group at the long focal point end.

Further, a position of the second lens group in the macro mode may be made closer to an image plane than a position of the second lens group at the short focal point end.

Furthermore, when focusing is achieved on an infinite distance, the interval between the third and fourth lens groups may be made so as to be shortest at the short focal point end.

Further, a condition, $f_{12T}/f_1 < -1$, may be satisfied when $f_1$ is a focal length of the first lens group and $f_{12T}$ is a synthesized focal length of the first and second lens groups at the long focal point end.

BRIEF DESCRIPTION OF THE DRAWINGS

A more complete appreciation of the present invention and many of the attendant advantages thereof will be readily obtained as the same becomes better understood by reference to the following detailed description when considered in conjunction with accompanying drawings, wherein:

FIG. 24 is a diagram illustrating the aberration curve of the zoom lens in an infinite distance at the short focal point end;

DETAILED DESCRIPTION OF THE PREFERRED EMBODIMENTS

Figure 1:
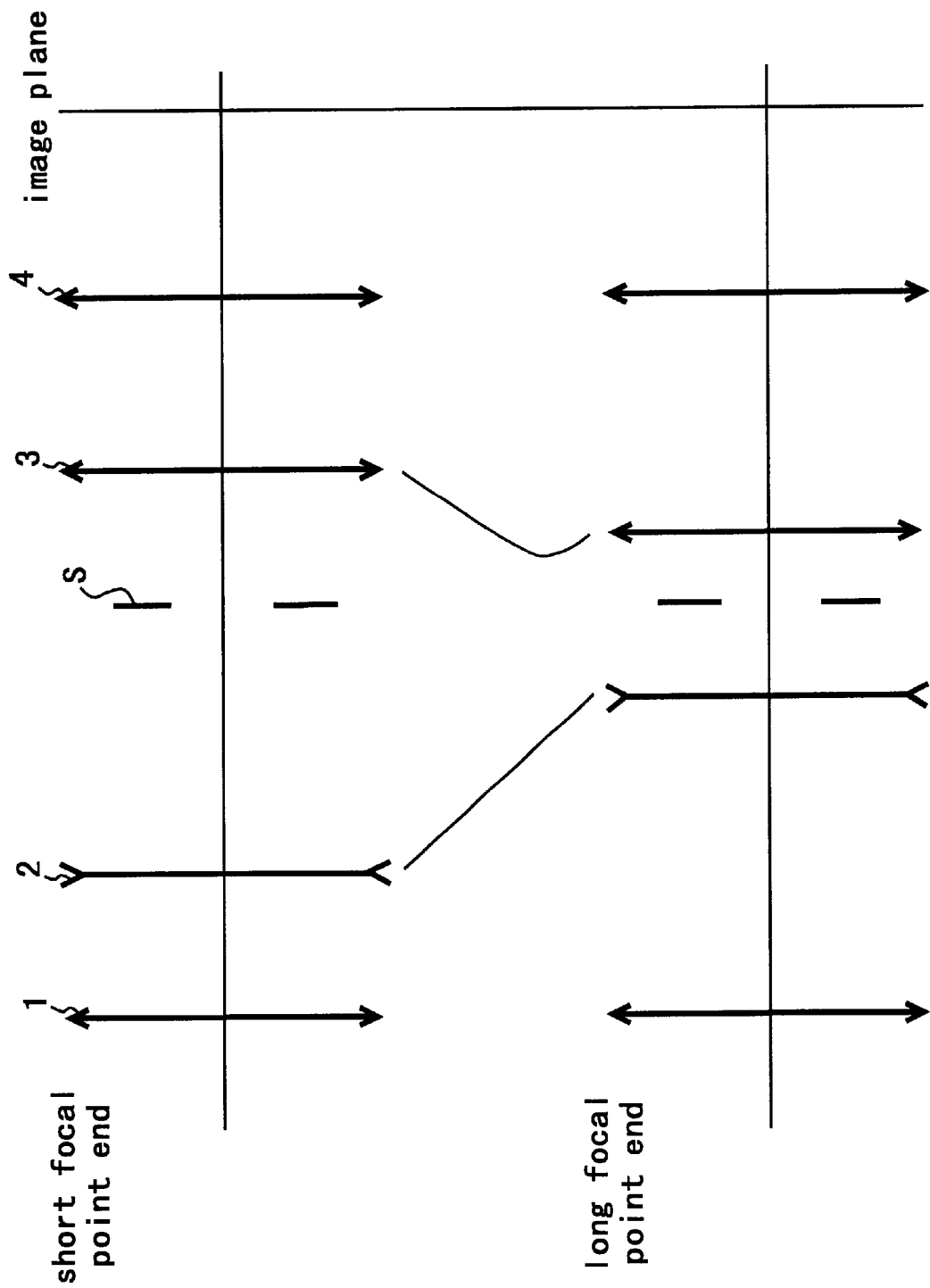
FIG. 1 is a diagram for explaining a construction of a zoom lens according to a preferred embodiment of the present invention.
Figure 2:
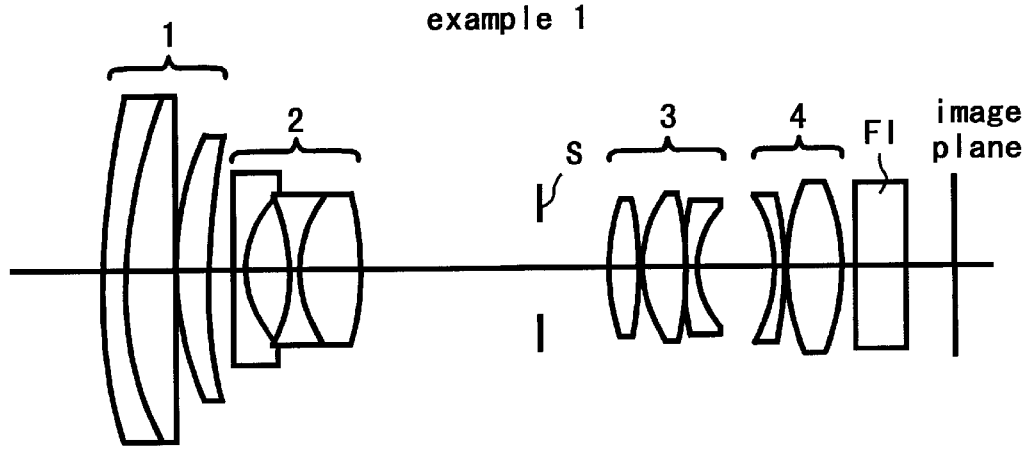
FIG. 2 is a diagram illustrating a construction of a zoom lens of Example 1 of the preferred embodiment.
Figure 3:
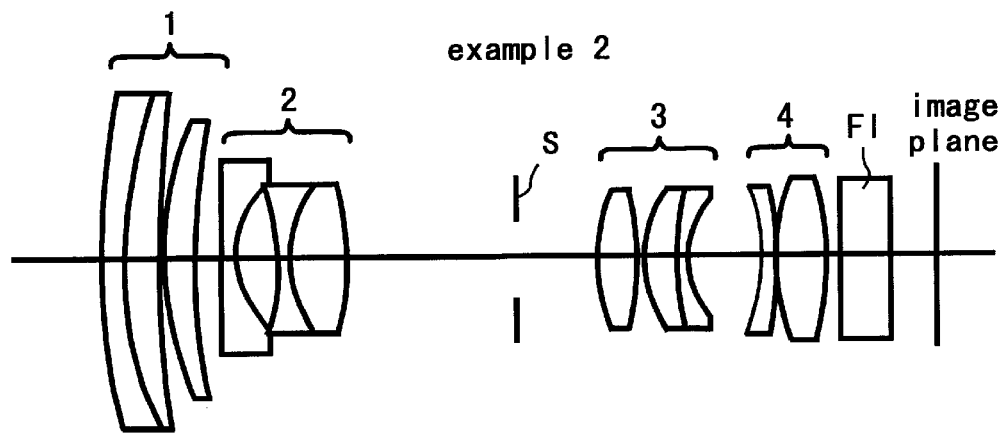
FIG. 3 is a diagram illustrating a construction of a zoom lens of Example 2 of the preferred embodiment.
Figure 4:
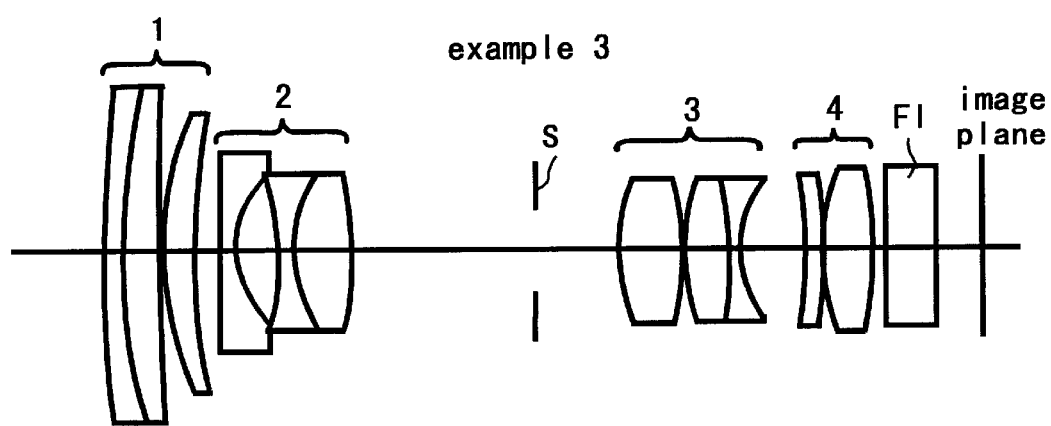
FIG. 4 is a diagram illustrating a construction of a zoom lens of Example 3 of the preferred embodiment.
Figure 5:
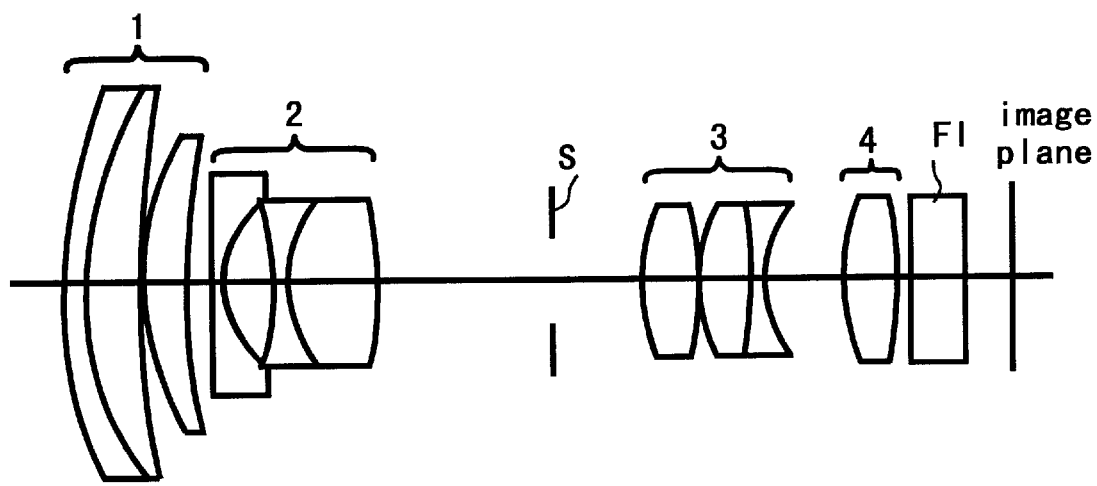
FIG. 5 is a diagram illustrating a construction of a zoom lens of Example 4 of the preferred embodiment.
Figure 6:
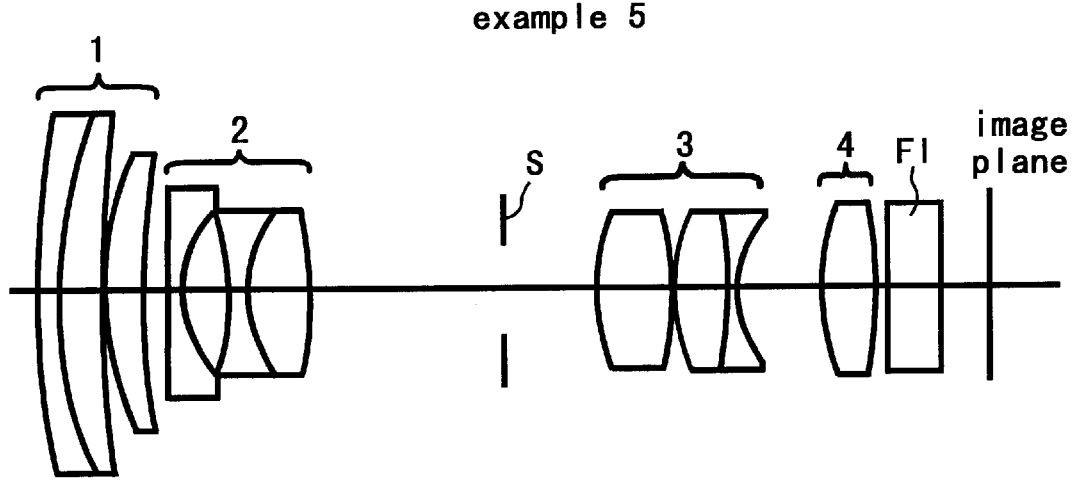
FIG. 6 is a diagram illustrating a construction of a zoom lens of Example 5 of the preferred embodiment.

Referring now to the drawings, where like reference numerals designate identical or corresponding parts throughout the several views, preferred embodiments of the present invention are described.

FIG. 1 is a diagram for explaining a construction of a zoom lens according to a preferred embodiment of the present invention. As illustrated in the diagram, in order from the object side, the zoom lens includes a first lens group 1 having a positive focal length, a second lens group 2 having a negative focal length, an opening iris S, a third lens group 3 having a positive focal length, and a fourth lens group 4 having a positive focal length. The zoom lens is configured such that when zooming from a short focal point end (illustrated in the upper portion of FIG. 1) toward a long focal point end (illustrated in the lower portion of FIG. 1), the second lens group 2 monotonously moves from the object side toward the image side, and the third lens group 3 first moves from the image side toward the object side and then, after arriving at a position closest to the object side in an area at a long focal point side beyond an intermediate focal point, moves toward the image side. With regard to the term "monotonously", the intended meaning is simply "only in one direction". That is, the intended meaning of the phrase "the second group lens group monotonously moves from an object side toward an image side" is that "the second lens group lens moves only in one direction from an object side toward an image side", while the third lens group first moves in one direction and then moves in another direction.

Generally, in a zoom lens including a first lens group having a positive focal length; a second lens group having a negative focal length; a third lens group having a positive focal length; and a fourth lens group having a positive focal length, when zooming, the first lens group and the third lens group that has an opening iris are fixed, the second lens group is moved for changing the magnification, and the fourth lens group is moved for keeping the position of an object plane constant. In this case, however, because the second lens group substantially performs the entire function of changing the magnification, the amount of moving the second lens group is relatively large. Therefore, the first lens group must be positioned relatively far from the opening iris, and thereby the effective diameter (i.e., the outer diameter) of the first lens group cannot be made small.

In the preferred embodiment of the present invention, therefore, when zooming, the third lens group 3 and the second lens group 2 sandwiching the opening iris S are moved in opposite directions to each other so as to cause the third lens group 3 to perform a portion of the function of changing the magnification and thereby to enable the moving distance of the second lens group 2 to be reduced. Thereby, the first lens group 1 can be positioned closer to the opening iris 3, such that the effective diameter of the first lens group 1 can be made small.

When zooming from a short focal point end toward a long focal point end, as illustrated in FIG. 1, the third lens group 3 first moves from the image side toward the object side, and then, after arriving at a position closest to the object side in an area at a long focal point side beyond an intermediate focal point, moves toward the image side. That is, in a vicinity of the long focal point end, the third lens group 3 and the second lens group 2 move in a same direction.

When zooming from a short focal point end toward a long focal point end, the magnification of the second lens group 2 is gradually reduced so as to have a smallest number at the long focal point end. When the magnification of the second lens group 2 is −1 with the first lens group 1 being a datum point, an image of an object, which is formed by the first lens group 1 and the second lens group 2, is positioned closest to the image plane. That is, when zooming, if the magnification of the second lens group 2 changes crossing over −1, for example, from −0.6 to −1.2, the position of the image formed by a synthesized system of the first lens group 1 and the second lens group 2 reverses at a point where the magnification of the second lens group 2 is −1. The actual position of the image plane is corrected by a movement of the third lens group 3 and the fourth lens group 4 so as to be kept at a constant position. In the preferred embodiment, the third lens group 3 is moved in a manner as described above for performing a portion of the function of keeping the image plane constant.

In the preferred embodiment, the point where the third lens group 3 arrives at the position closest to the object side must be in an area at the long focal point side beyond the intermediate focal point. If the third lens group 3 is configured so as to arrive at the position closest to the object side in an area at the short focal point side beyond the intermediate focal point, the ratio the third lens group 3 performs the function of changing the magnification is small and thereby the effect of making small the outer diameter of the first lens group 1 is small. For the same reason, the third lens group 3 must be positioned closer to the object side at the long focal point end than at the short focal point end.

It is more preferable that the third lens group 3 arrives at the position closest to the object side in an area where the second lens group 2 has moved more than ¾ of the total moving distance from the short focal point end toward the long focal point side. The closer to the long focal point side the position where the third lens group 3 is closest to the object side is, the larger the ratio the third lens group 3 performs the function of changing the magnification.

In the preferred embodiment, because the third lens group 3 performs both a function of changing the magnification and a function of keeping the image plane in a constant position, the fourth lens group 4 can be fixed when zooming. By thus configuring the fourth lens group 4, a zooming operation can be performed by moving only two lens groups, i.e., the second lens group 2 and the third lens group 3. Thereby, the number of actuators that drive the lens groups when zooming can be reduced. Further, the power consumption can be suppressed because the torque for driving the lens groups can be made small.

In order to realize a zoom lens according to the above preferred embodiment of the present invention with a simpler mechanism, the first lens group 1 is preferably always fixed, because the first lens group 1 is the largest and heaviest one of the lens groups and thereby moving the first lens group 1 tends to lead to deteriorating the simplicity of the mechanism and the power saving feature of the zoom lens. Further, when focusing is performed by moving the first lens group 1, the first lens group 1 tends to be large in order to obtain a sufficient peripheral light quantity in focusing on a shorter distance.

Furthermore, the opening iris S is preferably always fixed, because a shutter is generally provided at the position of the opening iris S and moving the shutter causes the mechanism of the shutter to be complicated, which is not desirable. Furthermore, the shutter generally generates a vibration when the shutter is driven. Therefore, if the shutter is configured to move, the vibration tends to be transmitted to other parts of the zoom lens, thereby causing blurring of an image.

In the zoom lens according to the above preferred embodiment, focusing may be achieved by moving the whole part of the zoom lens, or when the zoom lens is used in a digital camera, by moving a light receiving element, such as a CCD. Alternatively, focusing may be achieved by moving a lens group other than the first lens group 1, which is called an inner focusing method. In this case, the fourth lens group 4 is most suitable for moving for focusing. If the fourth lens group 4 is configured so as to be fixed when zooming, the interval between the third lens group 3 and the fourth lens group 4 is larger at the long focal point end than at the short focal point end. Because the moving distance for focusing on an object at a same distance is largest at the long focal point end, it is convenient to move the fourth lens group 4 for focusing.

In the above preferred embodiment, a focal length of the first lens group 1, $f_1$, and a synthesized focal length of the first lens group 1 and the second lens group 2 at the long focal point end, $f_{12T}$, preferably satisfy a condition:

$$-1.2 < (f_{12T}/f_1) < -1.0.$$

The above condition is effective in reducing the size of a lens system. In the above condition, a parameter of $f_{12T}/f_1$ is the magnification of the second lens group 2 at the long focal point end. In order to reduce the size of a lens system, the power of the first lens group 1 must be increased, i.e., the focal length must be shortened. Therefore, the magnification of the second lens group 2 is preferably made smaller than −1. In other words, because of this requirement on the second lens group 2, the third lens group 3 is moved as described above so as to keep the image plane in the constant position. If the magnification of the second lens group 2 is −1.2 or smaller, the ratio the third lens group 3 bears in changing the magnification is reduced and thereby the power of the second lens group 2 is required to be increased, which is disadvantageous in correcting the aberration of the zooming lens.

Furthermore, in the above preferred embodiment, the synthesized focal length of the first lens group 1 and the second lens group 2 at the long focal point end, $f_{12T}$, a synthesized focal length of the first lens group 1 and the second lens group 2 at the short focal point end, $f_{12W}$, a synthesized focal length of the first lens group 1 through the third lens group 3 at the long focal point end, $f_{123T}$, and a synthesized focal length of the first lens group 1 through the third lens group 3 at the short focal point end, $f_{123W}$, preferably satisfy a condition:

$$1.3 < (f_{123T}/f_{12T})/(f_{123W}/f_{12W}) < 1.5.$$

In the immediately above condition, $(f_{123T}/f_{12T})$ is the magnification of the third lens group 3 at the long focal point end and $(f_{123W}/f_{12W})$ is the magnification of the third lens group 3 at the short focal length end. If the ratio of $(f_{123T}/f_{12T})/(f_{123W}/f_{12W})$ is 1.3 or smaller, the function of the third lens group 3 of changing the magnification is not sufficiently large, thereby causing the first lens group 1 to be enlarged. On the other hand, if the ratio of $(f_{123T}/f_{12T})/(f_{123W}/f_{12W})$ is 1.5 or larger, the function of the second lens group 2 of changing the magnification is reduced, thereby causing the change in the diameter of an incident pupil as a result of zooming to be reduced. Therefore, if the opening iris S is constant, the change of the F number from the short focal point end to the long focal point end is caused to be relatively large. When the change in the F number is large, the F number at the short focal point end must be reduced or alternatively the F number of the long focal point end must be increased. If the F number at the short focal point end is reduced, the aberration correction is difficult, and if the F number at the long focal point is increased, blurring due to moving of the zoom lens tends to be caused. An alternative method of keeping the F number constant by changing the diameter of the opening iris S while zooming is available, but this method complicates the mechanism of a shutter, which is undesirable.

Furthermore, in the above preferred embodiment, by configuring each of the lens groups 1–4 with three or less lenses and including at least one non-spherical surface in the second, third and fourth lens groups 2, 3, 4, respectively, a relatively high image focusing performance that can be compatible with a light receiving element having a resolution of more than 3 million pixels can be realized.

Now, five concrete examples of a zoom lens according to the above preferred embodiment of the present invention are described with reference to FIGS. 2–6. Reference numerals 1–4 denote first through fourth lens groups as in FIG. 1, and a symbol S denotes an opening iris. Further a symbol F1 collectively denotes various filters and a cover glass for a light receiving element.

In each of the examples, for each surface of a lens or an iris, which is numbered in order from the object side, the radius of curvature is denoted by R, the surface interval by D, the refractive index and the Abbe number of lens material for a "d" line by $N_d$ and $v_d$. A mark (*) is put on a lens surface having a non-spherical surface, and the radius of curvature R on the non-spherical surface is a paraxial radius of curvature.

The shape of a non-spherical surface is defined by giving a cone constant, K, a coefficient of higher degrees, $A_4$, $A_6$, $A_8$, $A_{10}$, ..., and an inverse number of a paraxial radius of curvature, C(1/R), to a known formula, $X = CH^2/[1+\sqrt{1-(1+K)C^2H^2}] + A_4H^4 + A_6H^6 + A_8H^8 + A_{10}H^{10}$ ..., wherein H represents the height from the optical axis and X represents an amount of a change in the optical axial direction. Further, f represents a focal length of an entire system, F/No represent an F number and represents a half image angle.

EXAMPLE 1 f=7.52~21.28, F/No.=2.47~3.13, ω=33.012.3

| surface number | R | D | $N_d$ | $v_d$ | note |
|---|---|---|---|---|---|
| 01 | 60.598 | 1.400 | 1.84666 | 23.78 | first lens |
| 02 | 26.077 | 3.130 | 1.77250 | 49.62 | second lens |
| 03 | 238.711 | 0.100 | | | |
| 04 | 20.211 | 2.280 | 1.77250 | 49.62 | third lens |
| 05 | 42.379 | variable (A) | | | |
| 06* | 160.352 | 1.000 | 1.80610 | 40.73 | fourth lens |
| 07 | 6.109 | 2.910 | | | |
| 08 | −13.555 | 0.800 | 1.60311 | 60.69 | fifth lens |
| 09 | 8.210 | 4.120 | 1.83400 | 37.34 | sixth lens |
| 10 | −25.494 | variable (B) | | | |
| 11 | iris | variable (C) | | | |
| 12** | 14.529 | 1.870 | 1.58913 | 61.25 | seventh lens |
| 13 | −28.490 | 0.310 | | | |
| 14 | 8.088 | 2.730 | 1.62299 | 58.12 | eighth lens |
| 15 | −42.850 | 0.110 | | | |
| 16 | 34.251 | 0.800 | 1.76182 | 26.61 | ninth lens |
| 17 | 5.327 | variable (D) | | | |
| 18 | −9.842 | 0.800 | 1.69895 | 30.05 | tenth lens |
| 19 | −19.759 | 0.100 | | | |
| 20 | 15.226 | 3.630 | 1.58913 | 61.25 | eleventh lens |
| 21*** | −12.401 | arbitrary | | | |
| 22 | ∞ | 3.332 | 1.51680 | 64.20 | filters |
| 23 | ∞ | | | | |

*The non-spherical surface: sixth surface
K = 0.0, $A_4 = 7.08937 \times 10^{-5}$, $A_6 = -1.32612 \times 10^{-6}$, $A_8 = 2.14674 \times 10^{-8}$, $A_{10} = -1.76210 \times 10^{-10}$.

-continued

| surface number | R | D | $N_d$ | $v_d$ | note |
|---|---|---|---|---|---|

**The non-spherical surface: twelfth surface
$K = -6.55474$, $A_4 = 4.66801 \times 10^{-5}$, $A_6 = -2.36439 \times 10^{-6}$, $A_8 = -7.24382 \times 10^{-8}$, $A_{10} = 1.61260 \times 10^{-9}$.
***The non-spherical surface: twenty-first surface
$K = -0.30272$, $A_4 = 2.44496 \times 10^{-4}$, $A_6 = -2.97795 \times 10^{-6}$, $A_8 = 7.52791 \times 10^{-8}$, $A_{10} = -9.97501 \times 10^{-10}$.

The variable amounts are as follows:

| | short focal point end f = 7.52 | intermediate focal point f = 12.59 | long focal point end f = 21.28 |
|---|---|---|---|
| A | 1.400 | 6.540 | 11.680 |
| B | 12.060 | 6.920 | 1.780 |
| C | 4.587 | 2.457 | 1.148 |
| D | 5.233 | 7.363 | 8.672 |

Numeral values for the condition:

$(f_{12T}/f_1) = -1.120$, and $(f_{123T}/f_{12T})/(f_{123W}/f_{12W}) = 1.403$.

EXAMPLE 2

$f = 7.49 \sim 21.32$, F/No. $= 2.73 \sim 3.59$, $\omega = 33.3 \sim 12.1$

| surface number | R | D | $N_d$ | $v_d$ | note |
|---|---|---|---|---|---|
| 01 | 64.156 | 1.400 | 1.84666 | 23.78 | first lens |
| 02 | 28.132 | 2.620 | 1.77250 | 49.62 | second lens |
| 03 | 128.400 | 0.100 | | | |
| 04 | 20.955 | 2.220 | 1.77250 | 49.62 | third lens |
| 05 | 50.996 | variable (A) | | | |
| 06* | 1000.000 | 0.030 | 1.50703 | 53.43 | |
| 07 | 143.455 | 0.970 | 1.80610 | 40.73 | fourth lens |
| 08 | 6.301 | 2.700 | | | |
| 09 | −16.892 | 0.800 | 1.60311 | 60.69 | fifth lens |
| 10 | 7.803 | 3.870 | 1.83400 | 37.34 | sixth lens |
| 11 | −28.499 | variable (B) | | | |
| 12 | iris | variable (C) | | | |
| 13** | 14.098 | 0.030 | 1.50703 | 53.43 | |
| 14 | 15.088 | 2.810 | 1.58913 | 61.25 | seventh lens |
| 15 | −19.434 | 0.100 | | | |
| 16 | 7.426 | 2.530 | 1.62299 | 58.12 | eighth lens |
| 17 | 19.392 | 0.800 | 1.84666 | 23.78 | ninth lens |
| 18 | 5.960 | variable (D) | | | |
| 19 | −17.619 | 1.000 | 1.84666 | 23.78 | tenth lens |
| 20 | −54.253 | 0.100 | | | |
| 21 | 14.179 | 3.400 | 1.74330 | 49.22 | eleventh lens |
| 22 | −28.769 | 0.100 | 1.50703 | 55.43 | |
| 23*** | −19.491 | arbitrary | | | |
| 24 | ∞ | 3.332 | 1.51680 | 64.20 | filters |
| 25 | ∞ | | | | |

*The non-spherical surface: sixth surface
$K = 0.0$, $A_4 = 9.79867 \times 10^{-5}$, $A_6 = -8.51838 \times 10^{-7}$, $A_8 = 5.84308 \times 10^{-9}$, $A_{10} = -3.28416 \times 10^{-11}$.
**The non-spherical surface: thirteenth surface
$K = -5.42160$, $A_4 = 8.87326 \times 10^{-5}$, $A_6 = -2.32001 \times 10^{-7}$, $A_8 = -9.22059 \times 10^{-8}$, $A_{10} = 2.40577 \times 10^{-9}$.
***The non-spherical surface: twenty-third surface
$K = -0.84221$, $A_4 = 3.13701 \times 10^{-4}$, $A_6 = -1.18733 \times 10^{-6}$, $A_8 = -2.37535 \times 10^{-9}$, $A_{10} = -1.19234 \times 10^{-10}$.

The variable amounts are as follows:

| | short focal point end f = 7.49 | intermediate focal point f = 12.47 | long focal point end f = 21.32 |
|---|---|---|---|
| A | 1.600 | 6.940 | 12.280 |
| B | 11.790 | 6.450 | 1.110 |
| C | 5.515 | 3.201 | 1.364 |
| D | 4.835 | 7.149 | 8.986 |

The numeral values for the conditions:

$(f_{12T}/f_1) = -1.084$, and $(f_{123T}/f_{12T})/(f_{123W}/f_{12W}) = 1.464$.

EXAMPLE 3

$f = 7.52 \sim 21.33$, F/No. $= 2.70 \sim 3.50$, $\omega = 33.2 \sim 12.2$

| surface number | R | D | $N_d$ | $v_d$ | note |
|---|---|---|---|---|---|
| 01 | 123.000 | 1.400 | 1.84666 | 23.78 | first lens |
| 02 | 39.977 | 2.600 | 1.77250 | 49.62 | second lens |
| 03 | ∞ | 0.100 | | | |
| 04 | 22.002 | 2.330 | 1.77250 | 49.62 | third lens |
| 05 | 49.500 | variable (A) | | | |
| 06* | 1000.000 | 0.030 | 1.50703 | 53.43 | |
| 07 | 162.601 | 0.970 | 1.80610 | 40.73 | fourth lens |
| 08 | 6.689 | 2.870 | | | |
| 09 | −17.299 | 0.800 | 1.60311 | 60.69 | fifth lens |
| 10 | 8.203 | 4.120 | 1.83400 | 37.34 | sixth lens |
| 11 | −28.590 | variable (B) | | | |
| 12 | iris | variable (C) | | | |
| 13** | 12.249 | 0.030 | 1.50703 | 53.43 | |
| 14 | 13.210 | 4.440 | 1.58913 | 61.25 | seventh lens |
| 15 | −19.759 | 0.100 | | | |
| 16 | 12.150 | 3.060 | 1.77250 | 49.62 | eighth lens |
| 17 | −47.804 | 0.800 | 1.80518 | 25.46 | ninth lens |
| 18 | 7.200 | variable (D) | | | |
| 19 | −22.913 | 1.000 | 1.62004 | 36.30 | tenth lens |
| 20 | −273.270 | 0.100 | | | |
| 21 | 14.061 | 3.340 | 1.74330 | 49.22 | eleventh lens |
| 22 | −36.932 | 0.100 | 1.50703 | 53.43 | |
| 23*** | −25.189 | arbitrary | | | |
| 24 | ∞ | 3.332 | 1.51680 | 64.20 | filters |
| 25 | ∞ | | | | |

*The non-spherical surface: sixth surface
$K = 0.0$, $A_4 = 8.76330 \times 10^{-5}$, $A_6 = -1.00557 \times 10^{-6}$, $A_8 = 8.70046 \times 10^{-9}$, $A_{10} = -4.65380 \times 10^{-11}$.
**The non-spherical surface: thirteenth surface
$K = -4.77319$, $A_4 = 1.29390 \times 10^{-4}$, $A_6 = -1.30660 \times 10^{-7}$, $A_8 = -1.21202 \times 10^{-7}$, $A_{10} = 3.23950 \times 10^{-9}$.
***The non-spherical surface: twenty-third surface
$K = 3.43729$, $A_4 = 2.78810 \times 10^{-4}$, $A_6 = -1.81528 \times 10^{-6}$, $A_8 = 3.16416 \times 10^{-8}$, $A_{10} = -4.87685 \times 10^{-10}$.

The variable amounts are as follows:

| | short focal point end f = 7.52 | intermediate focal point f = 12.50 | long focal point end f = 21.33 |
|---|---|---|---|
| A | 1.40 | 7.250 | 13.100 |
| B | 12.800 | 6.950 | 1.100 |
| C | 5.498 | 3.155 | 1.335 |
| D | 4.552 | 6.895 | 8.715 |

The numerical number of the conditions:

$(f_{12T}/f_1) = -1.073$, and $(f_{123T}/f_{12T})/(f_{123W}/f_{12W}) = 1.455$.

EXAMPLE 4 f=7.51~20.91, F/No.=2.62~3.40, ω=32.8~12.6

| surface number | R | D | $N_d$ | $v_d$ | note |
|---|---|---|---|---|---|
| 01 | 29.916 | 1.400 | 1.84666 | 23.78 | first lens |
| 02 | 20.987 | 3.480 | 1.60311 | 60.69 | second lens |
| 03 | 63.867 | 0.100 | | | |
| 04 | 18.034 | 2.730 | 1.60311 | 60.69 | third lens |
| 05 | 41.342 | variable (A) | | | |
| 06* | 1000.000 | 0.040 | 1.50703 | 53.43 | |
| 07 | 90.347 | 0.960 | 1.83500 | 42.98 | fourth lens |
| 08 | 6.327 | 2.960 | | | |
| 09 | −20.914 | 1.040 | 1.62299 | 58.12 | fifth lens |
| 10 | 7.694 | 5.570 | 1.83400 | 37.34 | sixth lens |
| 11 | −36.134 | variable (B) | | | |
| 12 | iris | variable (C) | | | |
| 13** | 12.996 | 0.040 | 1.50703 | 53.43 | |
| 14 | 14.036 | 3.450 | 1.58913 | 61.25 | seventh lens |
| 15 | −21.510 | 0.100 | | | |
| 16 | 11.861 | 3.270 | 1.77250 | 49.62 | eighth lens |
| 17 | −31.300 | 0.810 | 1.76182 | 26.61 | ninth lens |
| 18 | 7.074 | variable (D) | | | |
| 19 | 13.968 | 3.230 | 1.51680 | 64.20 | tenth lens |
| 20 | −39.144 | 0.040 | 1.50703 | 53.43 | |
| 21 | −32.145 | arbitrary | | | |
| 22 | ∞ | 3.332 | 1.51680 | 64.20 | filters |
| 23 | ∞ | | | | |

*The non-spherical surface: sixth surface
$K = 0.0, A_4 = 1.52740 \times 10^{-4}, A_6 = -1.32245 \times 10^{-6}, A_8 = 1.09498 \times 10^{-8}, A_{10} = -424043 \times 10_{-11}$.
**The non-spherical surface: thirteenth surface
$K = -6.26756, A_4 = 1.83557 \times 10^{-4}, A_6 = -1.91030 \times 10^{-6}, A_8 = -5.84921 \times 10^{-8}, A_{10} = 1.97434 \times 10^{-9}$.
***The non-spherical surface: twenty-first surface
$K = 3.66661, A_4 = 1.65329 \times 10^{-4}, A_6 = -2.65988 \times 10^{-6}, A_8 = 8.32392 \times 10^{-8}, A_{10} = -1.47477 \times 10^{-9}$.

The variable amounts are as follows:

| | short focal point end f = 7.51 | intermediate focal point f = 12.50 | long focal point end f = 21.33 |
|---|---|---|---|
| A | 1.400 | 6.440 | 11.480 |
| B | 11.190 | 6.150 | 1.110 |
| C | 5.805 | 3.348 | 1.644 |
| D | 4.935 | 7.392 | 9.096 |

The numerical values of the conditions:
$(_{12T}/f_1) = -1.102$, and
$(f_{123T}/f_{12T})/(f_{123W}/f_{12W}) = 1.430$.

EXAMPLE 5 f=7.51~21.23, F/No.=2.68~3.50, ω=33.2~12.2

| surface number | R | D | $N_d$ | $v_d$ | note |
|---|---|---|---|---|---|
| 01 | 65.170 | 1.400 | 1.84666 | 23.78 | first lens |
| 02 | 29.478 | 2.740 | 1.77250 | 49.62 | second lens |
| 03 | 127.500 | 0.100 | | | |
| 04 | 22.349 | 2.440 | 1.77250 | 49.62 | third lens |
| 05 | 56.773 | variable (A) | | | |
| 06* | 1000.000 | 0.040 | 1.50703 | 53.43 | |
| 07 | 151.049 | 0.960 | 1.80610 | 40.73 | fourth lens |
| 08 | 6.787 | 2.910 | | | |
| 09 | −15.102 | 1.320 | 1.60311 | 60.69 | fifth lens |
| 10 | 9.190 | 3.780 | 1.83400 | 37.34 | sixth lens |
| 11 | −26.300 | variable (B) | | | |
| 12 | iris | variable (C) | | | |
| 13** | 13.381 | 0.040 | 1.50703 | 53.43 | |
| 14 | 14.483 | 4.960 | 1.58913 | 61.25 | seventh lens |
| 15 | −20.252 | 0.100 | | | |
| 16 | 11.816 | 3.240 | 1.77250 | 49.62 | eighth lens |
| 17 | −53.710 | 0.800 | 1.80518 | 25.46 | ninth lens |
| 18 | 7.300 | variable (D) | | | |
| 19 | 14.000 | 3.180 | 1.58913 | 61.25 | tenth lens |
| 20 | −66.205 | 0.040 | 1.50703 | 53.43 | |
| 21*** | −49.895 | arbitrary | | | |
| 22 | ∞ | 3.332 | 1.51680 | 64.20 | filters |
| 23 | ∞ | | | | |

*The non-spherical surface: sixth surface
$K = 0.0, A_4 = 1.07973 \times 10^{-4}, A_6 = -1.95022 \times 10^{-6}, A_8 = 3.30936 \times 10^{-8}, A_{10} = -2.82138 \times 10^{-10}$.
**The non-spherical surface: thirteenth surface
$K = -5.84434, A_4 = 1.31144 \times 10^{-4}, A_6 = 6.14724 \times 10^{-7}, A_8 = -1.68267 \times 10^{-7}, A_{10} = 4.04411 \times 10^{-9}$.
***The non-spherical surface: twenty-first surface
$K = 11.53148, A_4 = 1.63303 \times 10^{-4}, A_6 = -3.95256 \times 10^{-6}, A_8 = 1.19208 \times 10^{-7}, A_{10} = -1.84451 \times 10^{-9}$.

The variable amounts are as follows:

| | short focal point end f = 7.51 | intermediate focal point f = 12.55 | long focal point end f = 21.23 |
|---|---|---|---|
| A | 1.400 | 7.000 | 12.600 |
| B | 12.300 | 6.700 | 1.100 |
| C | 5.819 | 3.245 | 1.420 |
| D | 5.011 | 7.585 | 9.410 |

The numerical values of the conditions:
$(f_{12T}/f_1) = -1.100$, and
$(f_{123T}/f_{12T})/(f_{123W}/f_{12W}) = 1.447$.

Figure 7:
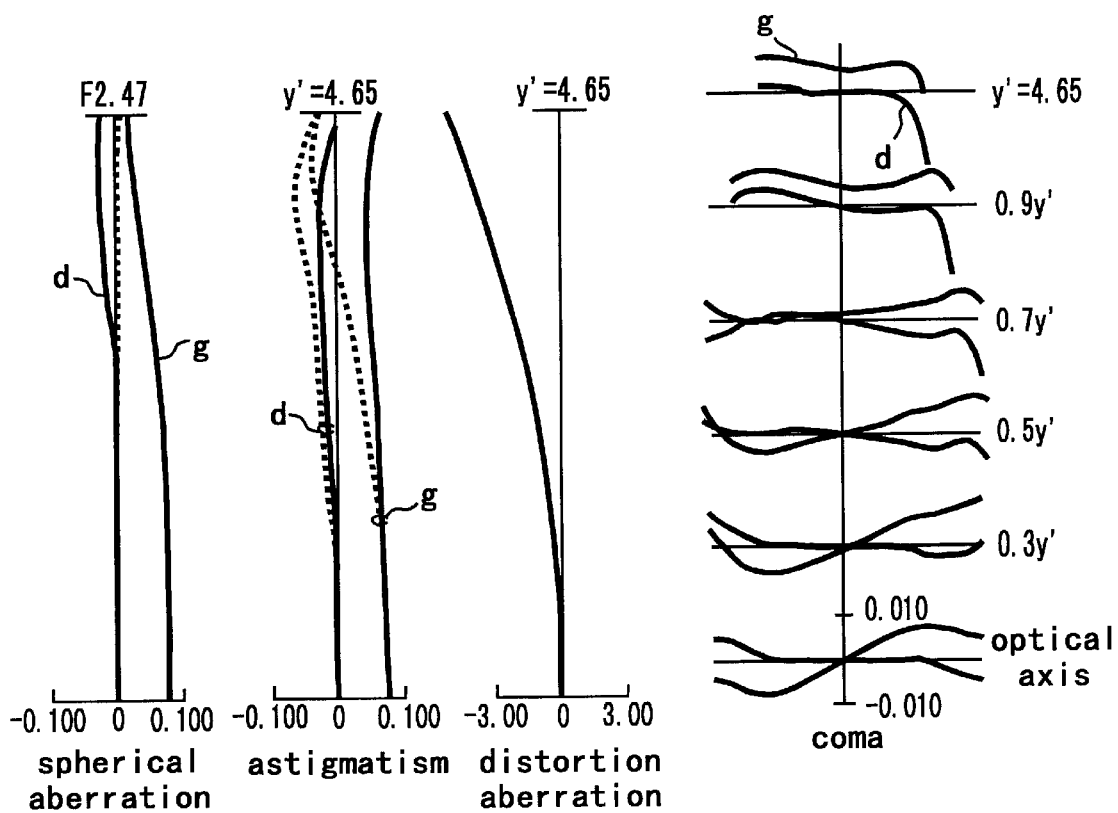
FIG. 7 is a diagram illustrating the aberration curve at the short focal point end in Example 1.
Figure 8:
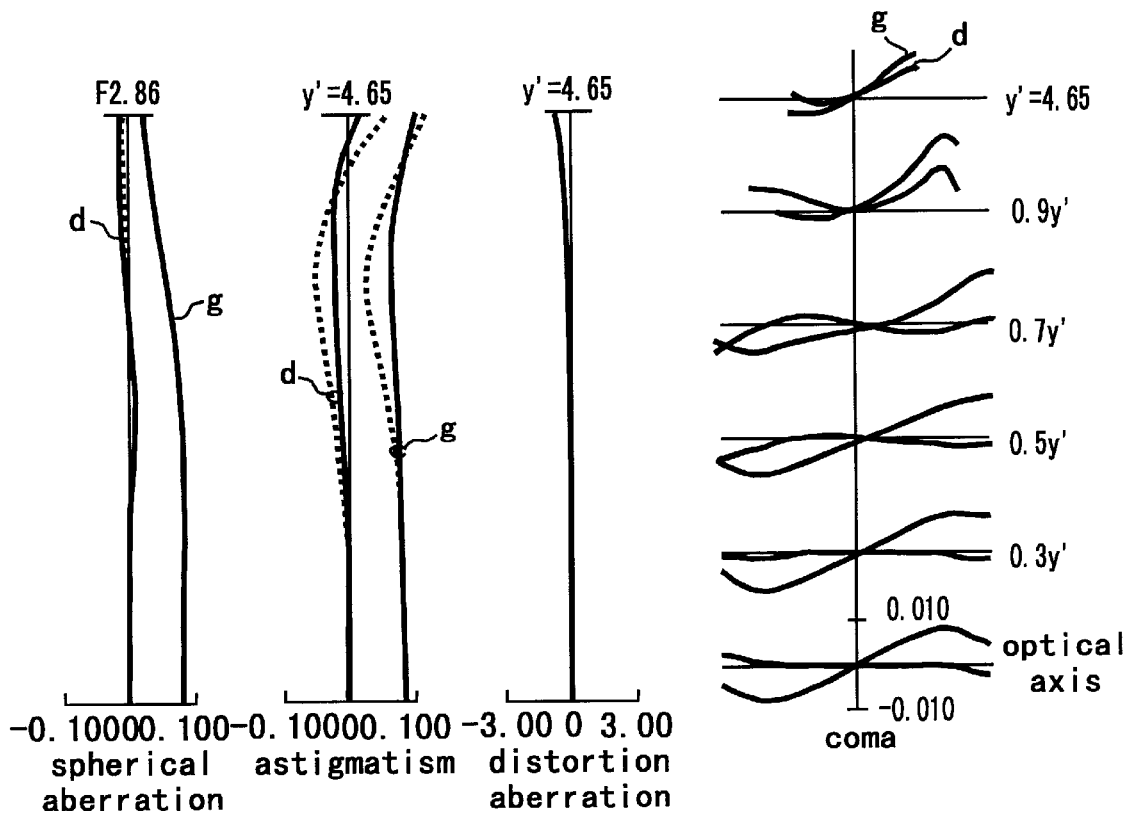
FIG. 8 is a diagram illustrating the aberration curve at the intermediate focal point in Example 1.
Figure 9:
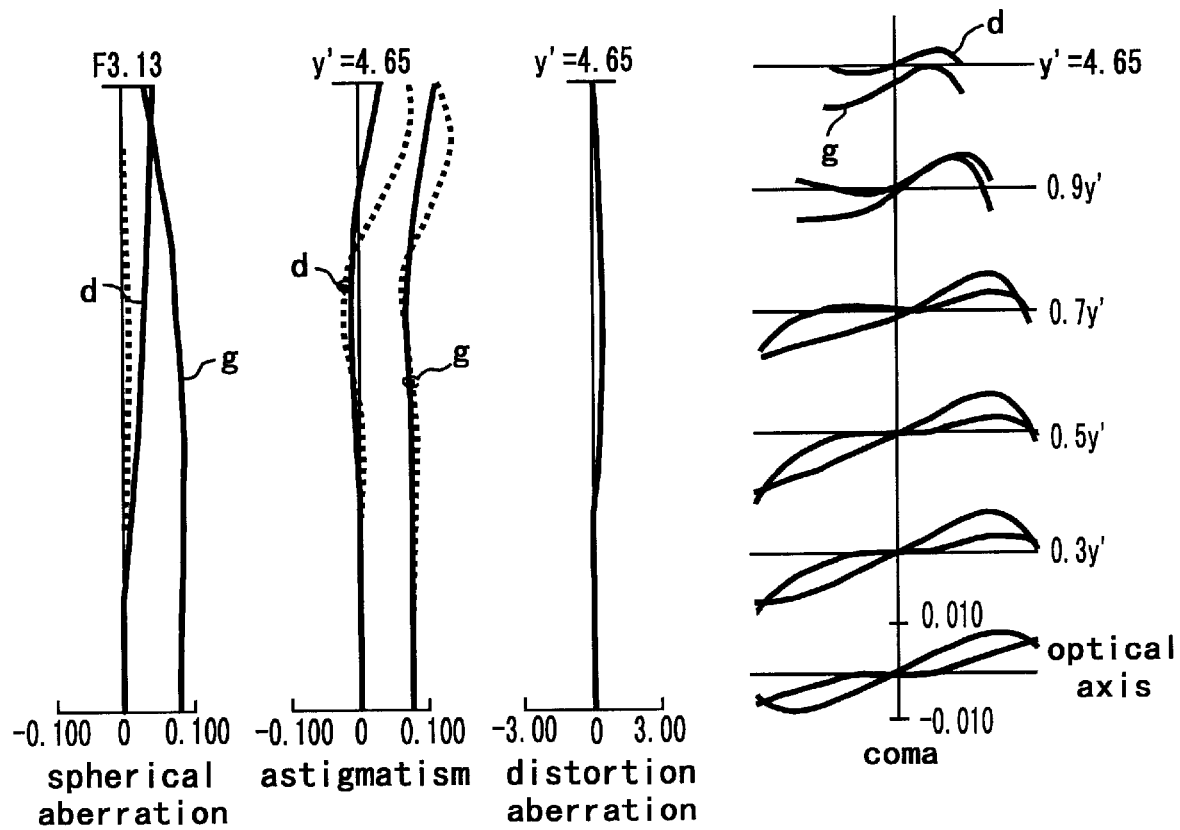
FIG. 9 is a diagram illustrating the aberration curve at the long focal point end in Example 1.
Figure 10:
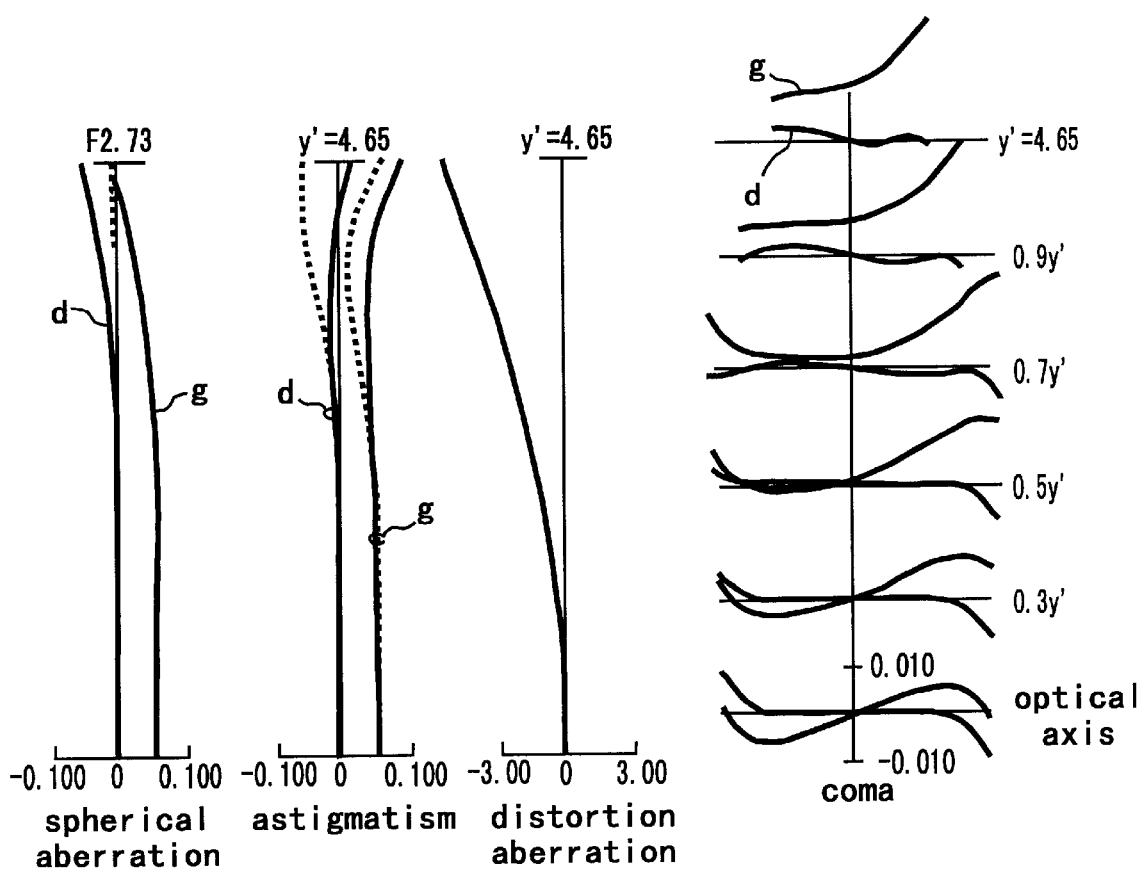
FIG. 10 is a diagram illustrating the aberration curve at the short focal point end in Example 2.
Figure 11:
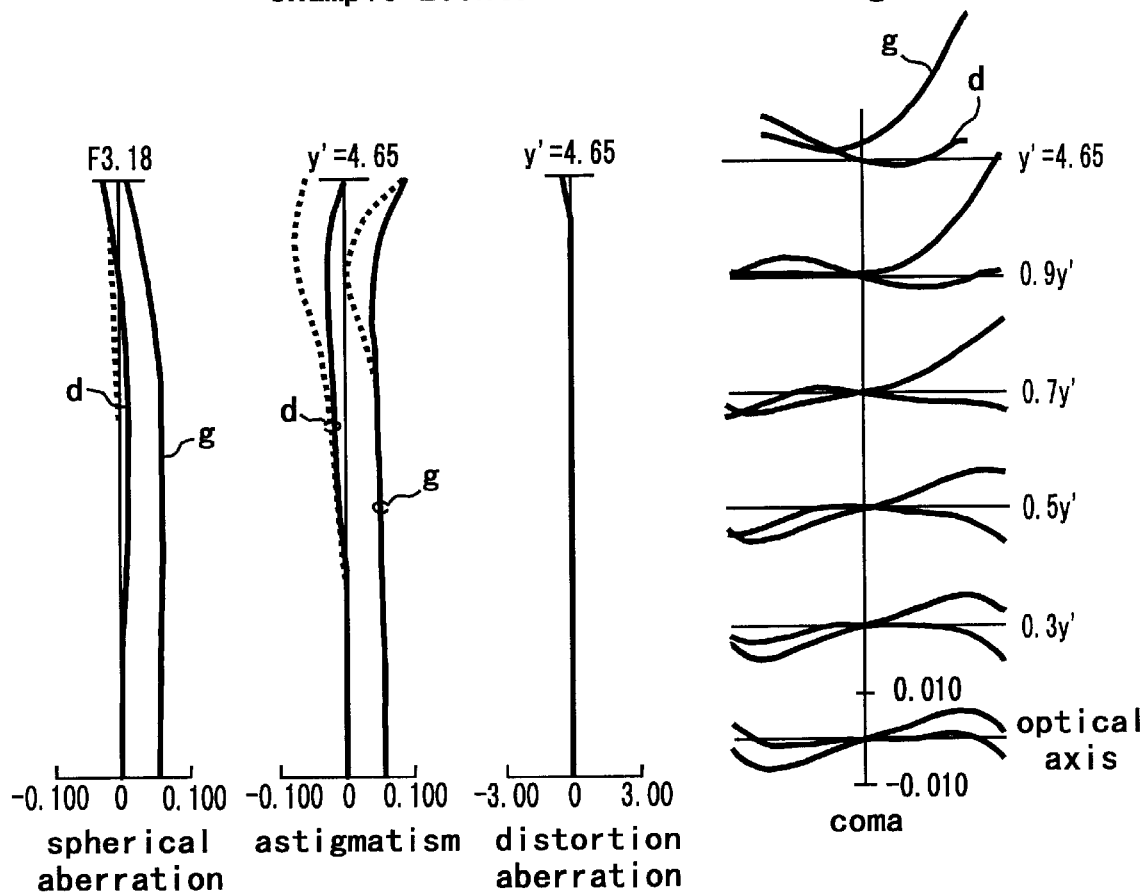
FIG. 11 is a diagram illustrating the aberration curve at the intermediate focal point in Example 2.
Figure 12:
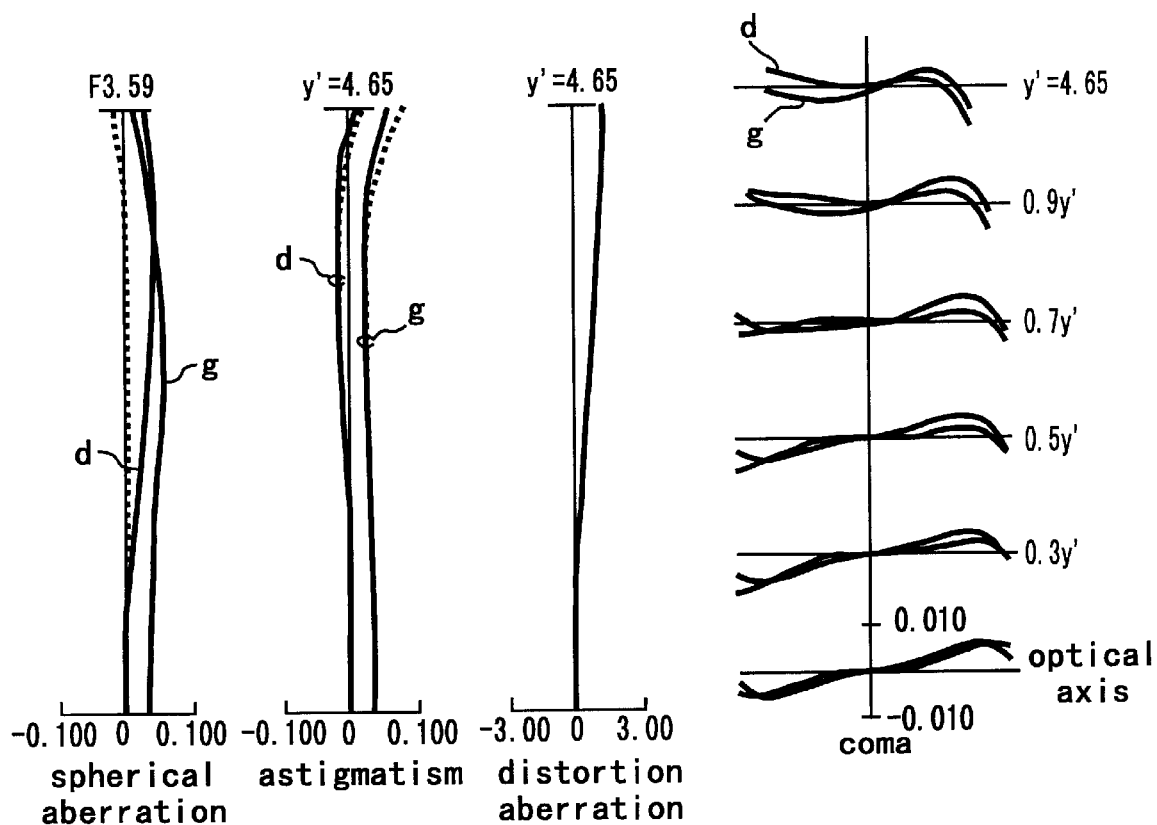
FIG. 12 is a diagram illustrating the aberration curve at the long focal point end in Example 2.
Figure 13:
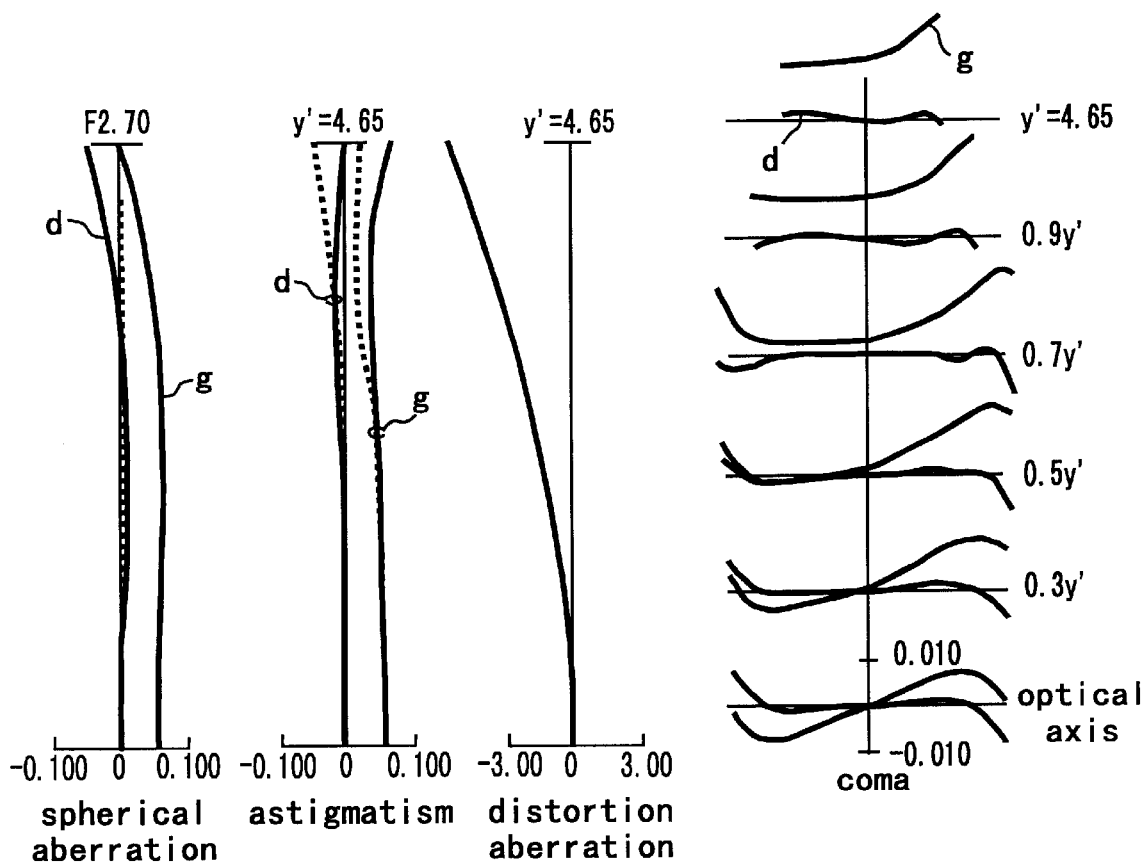
FIG. 13 is a diagram illustrating the aberration curve at the short focal point end in Example 3.
Figure 14:
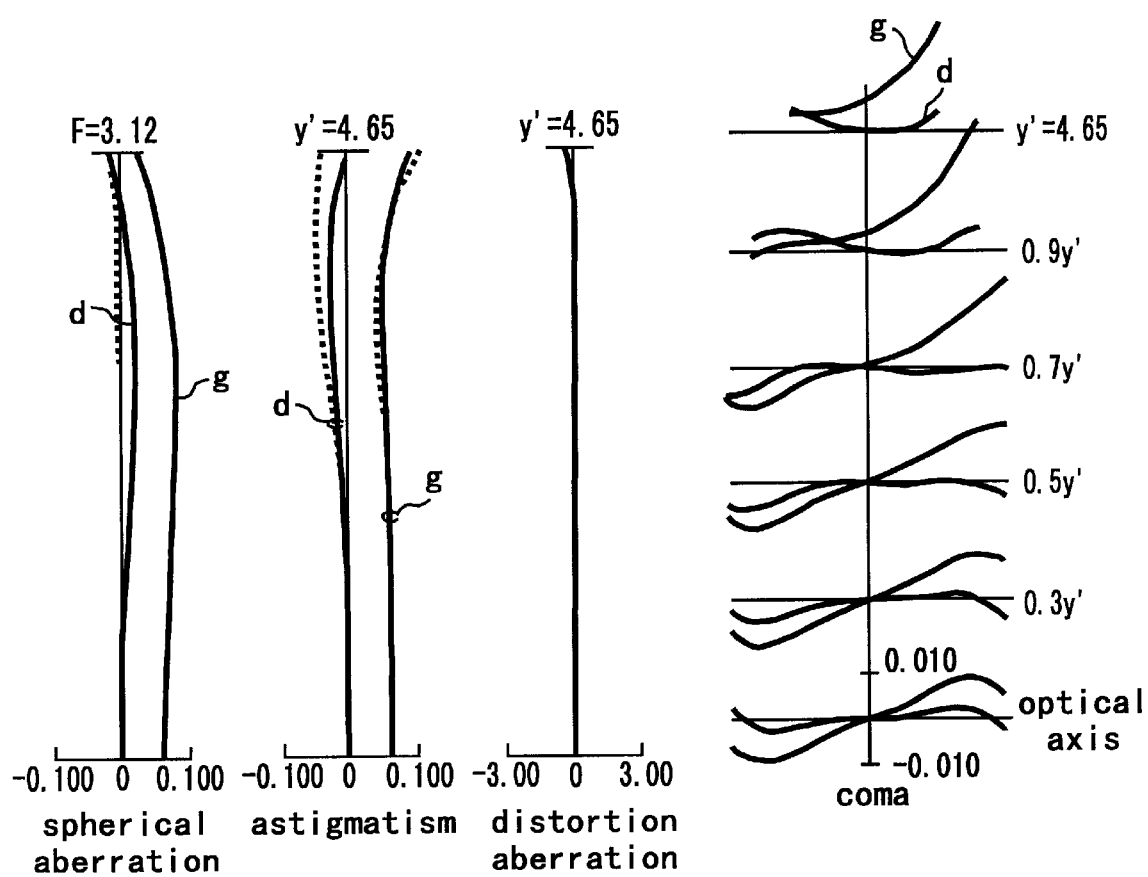
FIG. 14 is a diagram illustrating the aberration curve at the intermediate focal point in Example 3.
Figure 15:
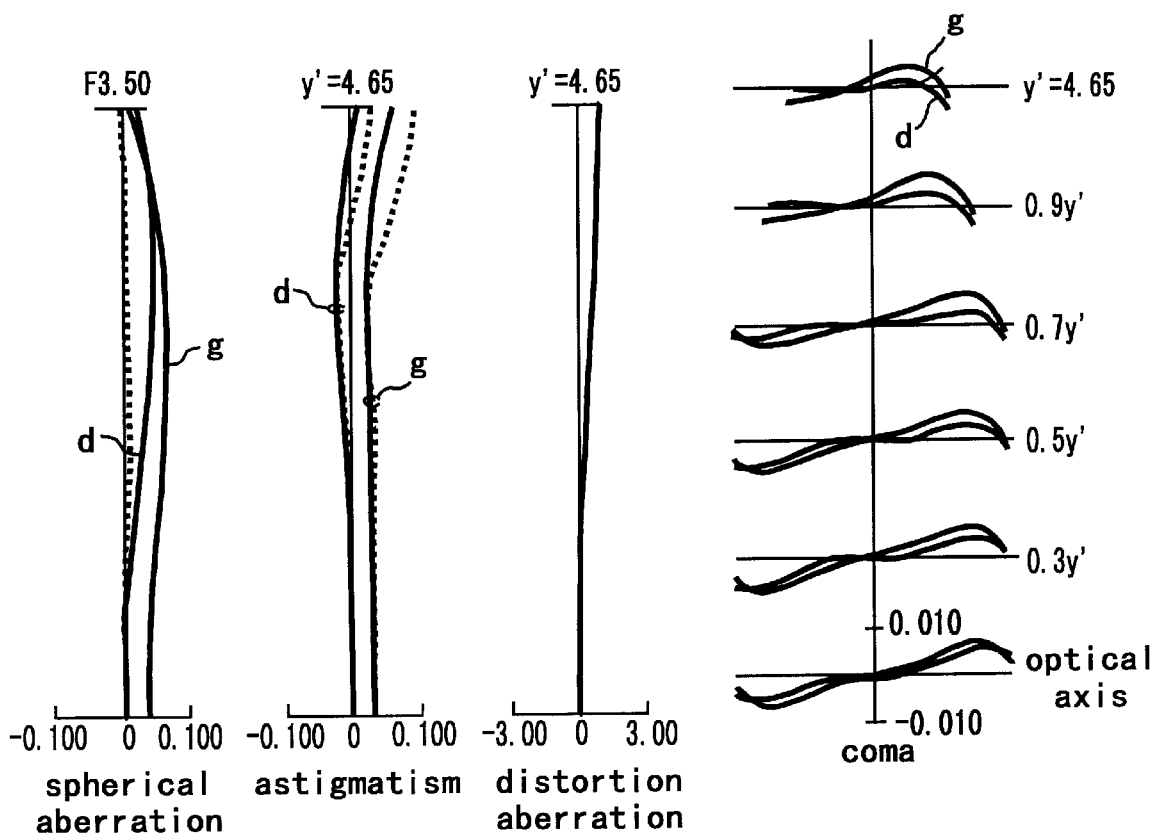
FIG. 15 is a diagram illustrating the aberration curve at the long focal point end in Example 3.
Figure 16:
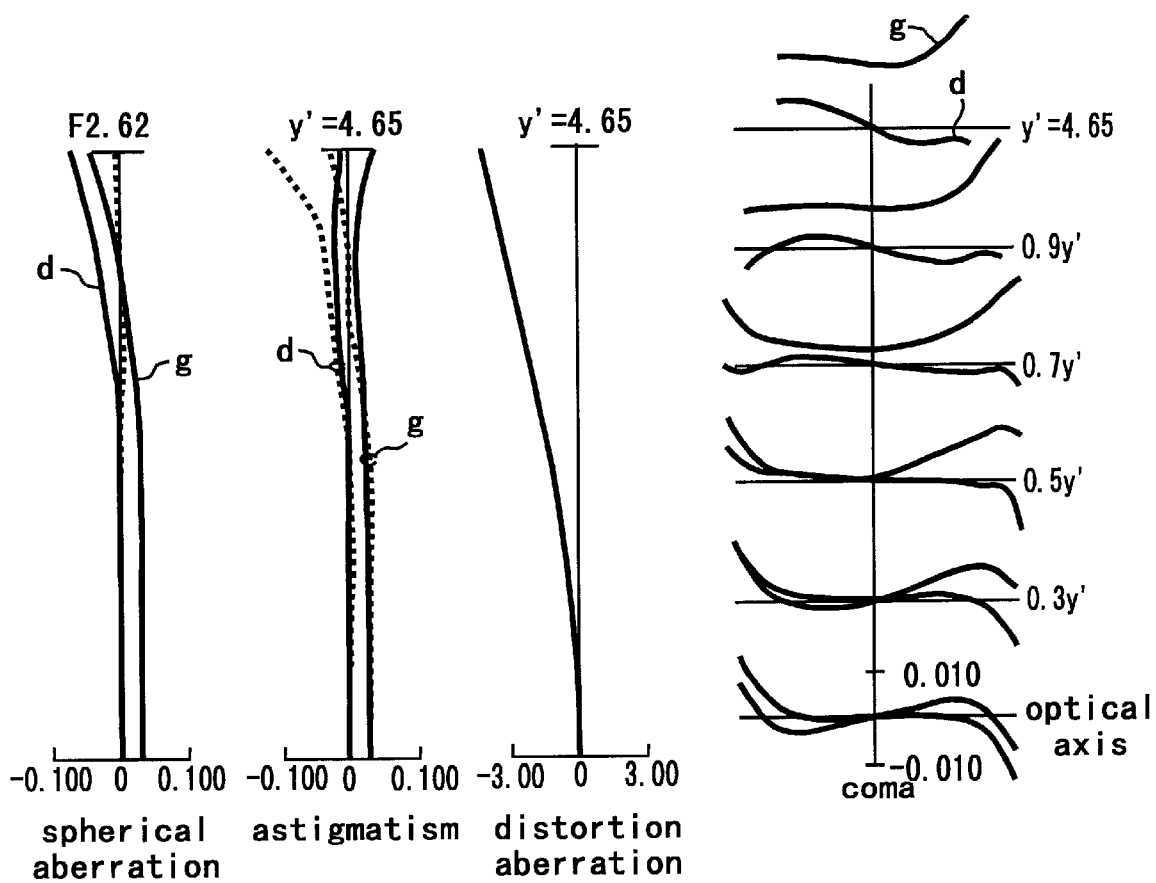
FIG. 16 is a diagram illustrating the aberration curve at the short focal point end in Example 4.
Figure 17:
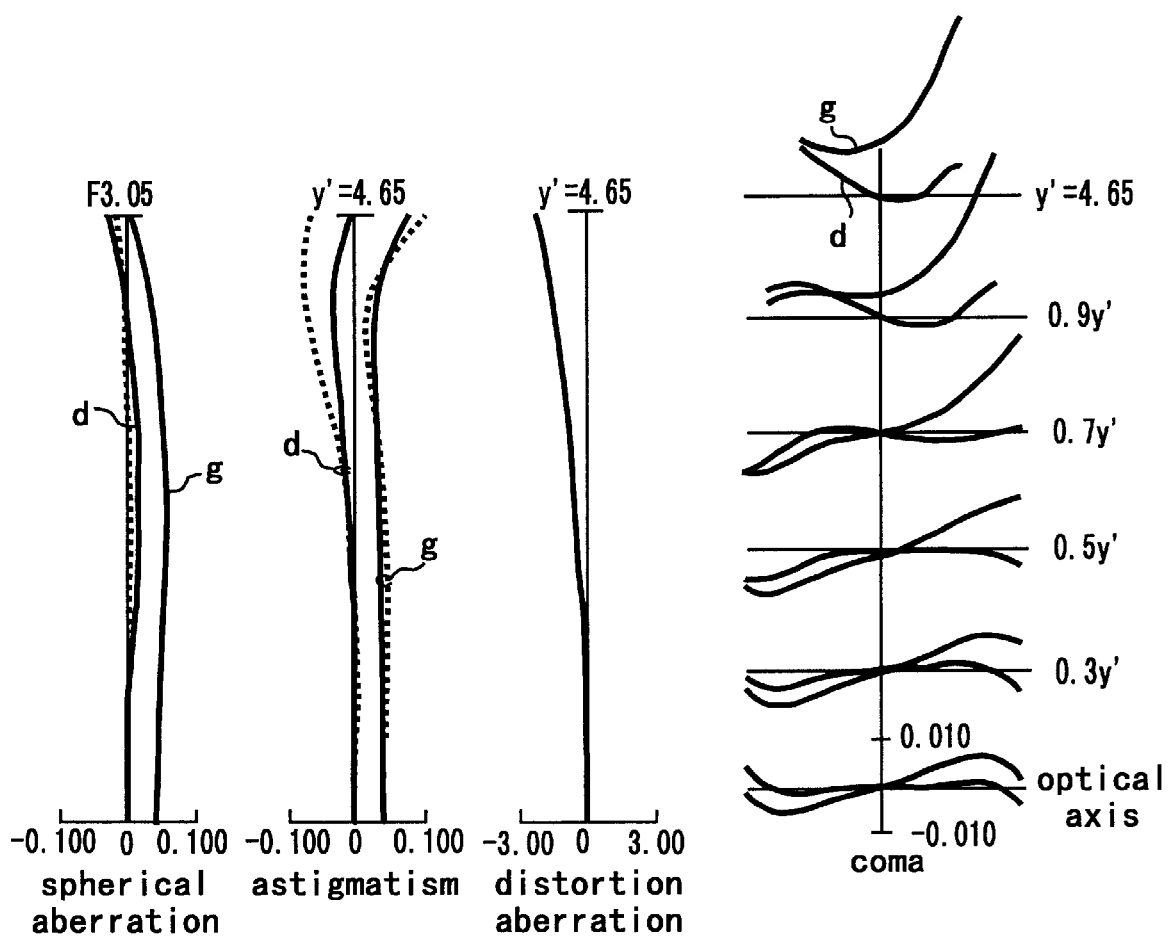
FIG. 17 is a diagram illustrating the aberration curve at the intermediate focal point in Example 4.
Figure 18:
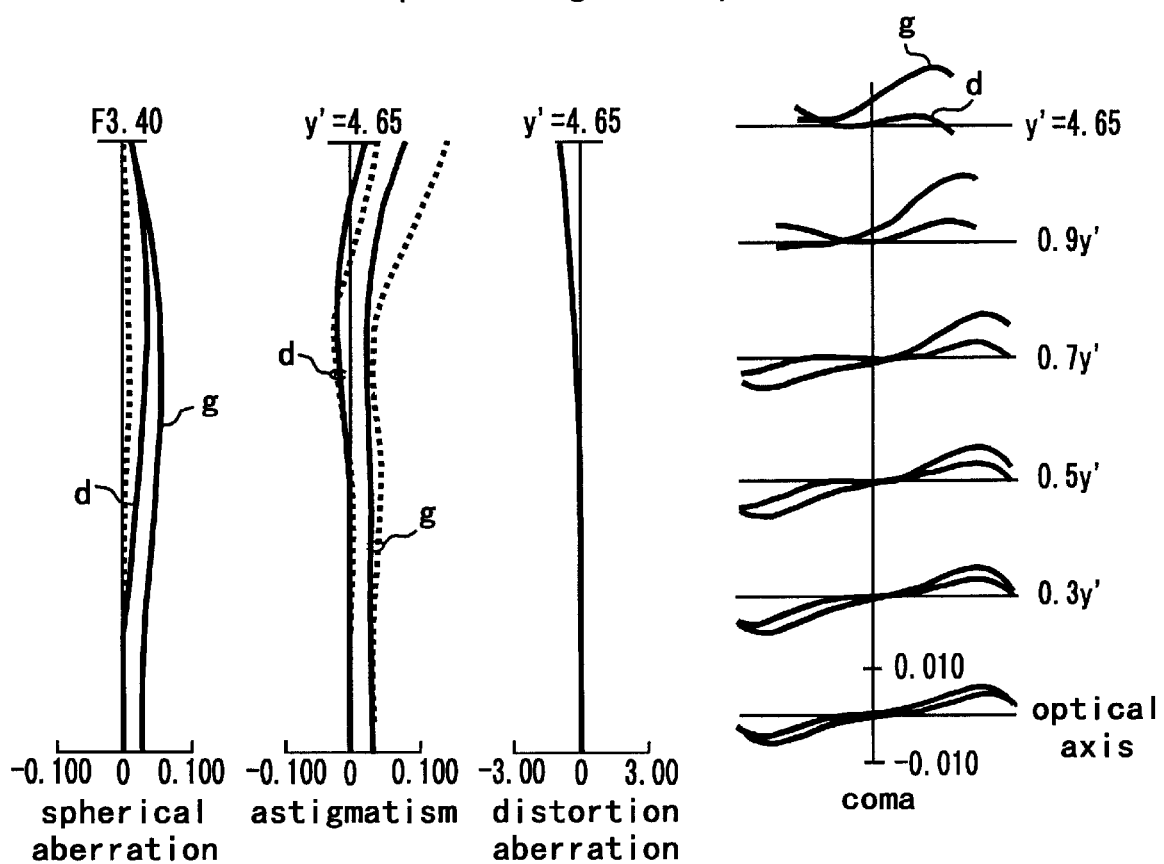
FIG. 18 is a diagram illustrating the aberration curve at the long focal point end in Example 4.
Figure 19:
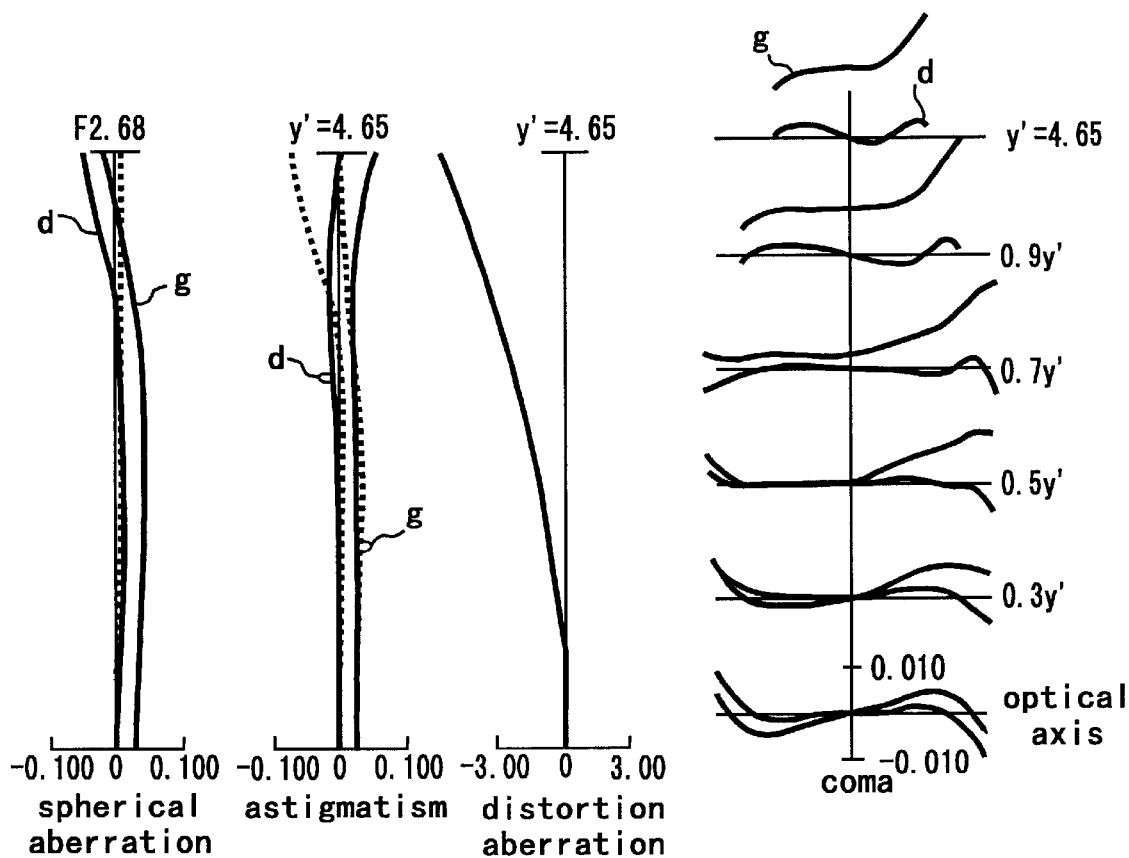
FIG. 19 is a diagram illustrating the aberration curve at the short focal point end in Example 5.
Figure 20:
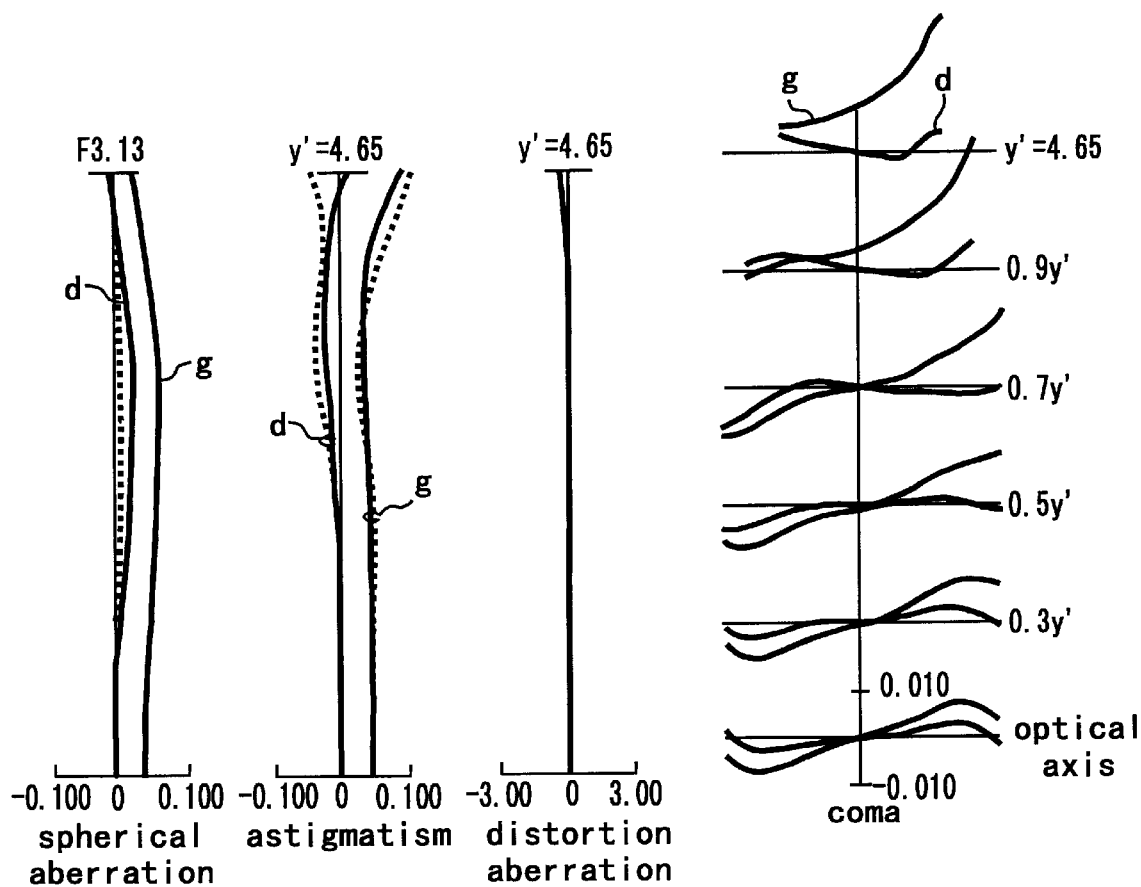
FIG. 20 is a diagram illustrating the aberration curve at the intermediate focal point in Example 5.
Figure 21:
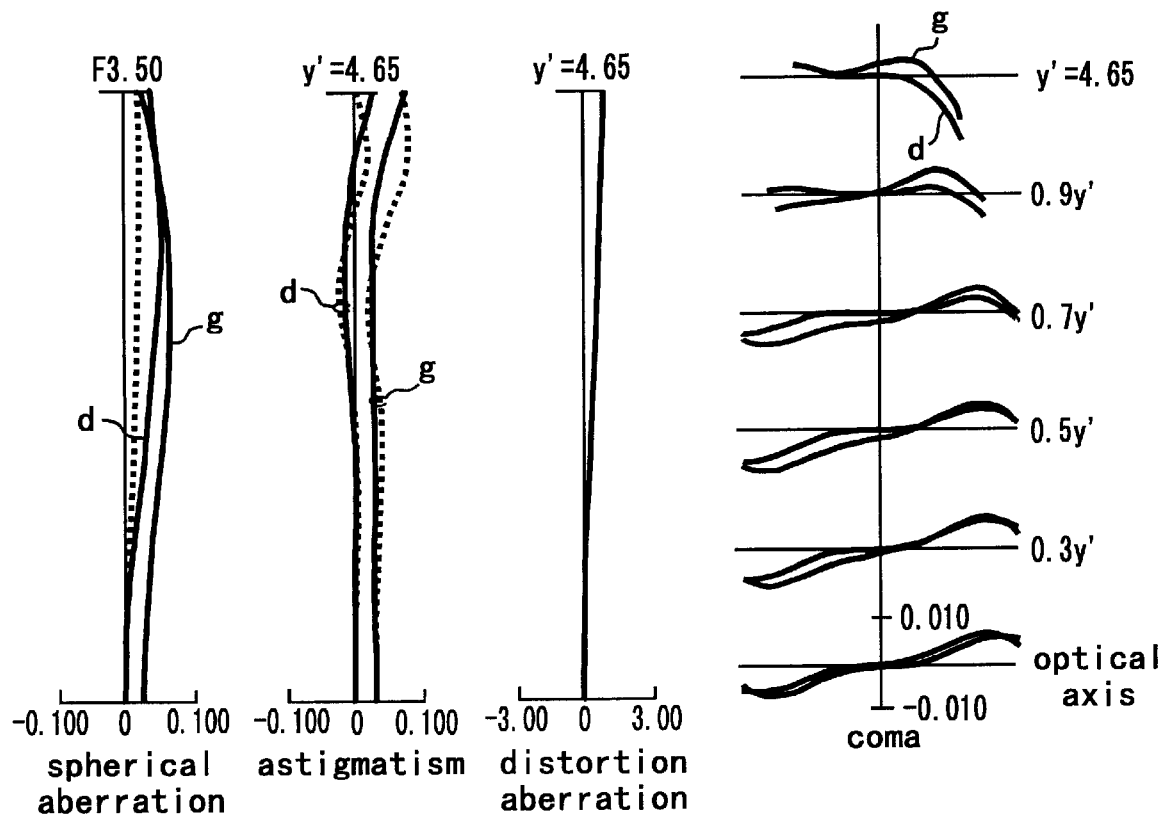
FIG. 21 is a diagram illustrating the aberration curve at the long focal point end in Example 5.

FIGS. 7–9 illustrate the aberration curves at the short focal point end, the intermediate focal point and the long focal point end with respect to above Example 1, FIGS. 10–12 with respect to Example 2, FIGS. 13–15 with respect to Example 3, FIGS. 16–18 with respect to Example 4, and FIGS. 19–21 with respect to Example 5, respectively. In each of the diagrams relating to the spherical aberration, the dotted lines indicate the spherical aberration under the sine condition, and in each of the diagrams relating to the astigmatism, the solid lines indicate the astigmatism in the sagittal plane and the dotted lines in the meridional plane. As apparent from these diagrams, in each example, the aberration is sufficiently corrected and the zoom lens of each example can be compatible with a light receiving element having a resolution of more than 3 million pixels.

A zoom lens according to another preferred embodiment of the present invention is hereinafter described.

Figure 22:
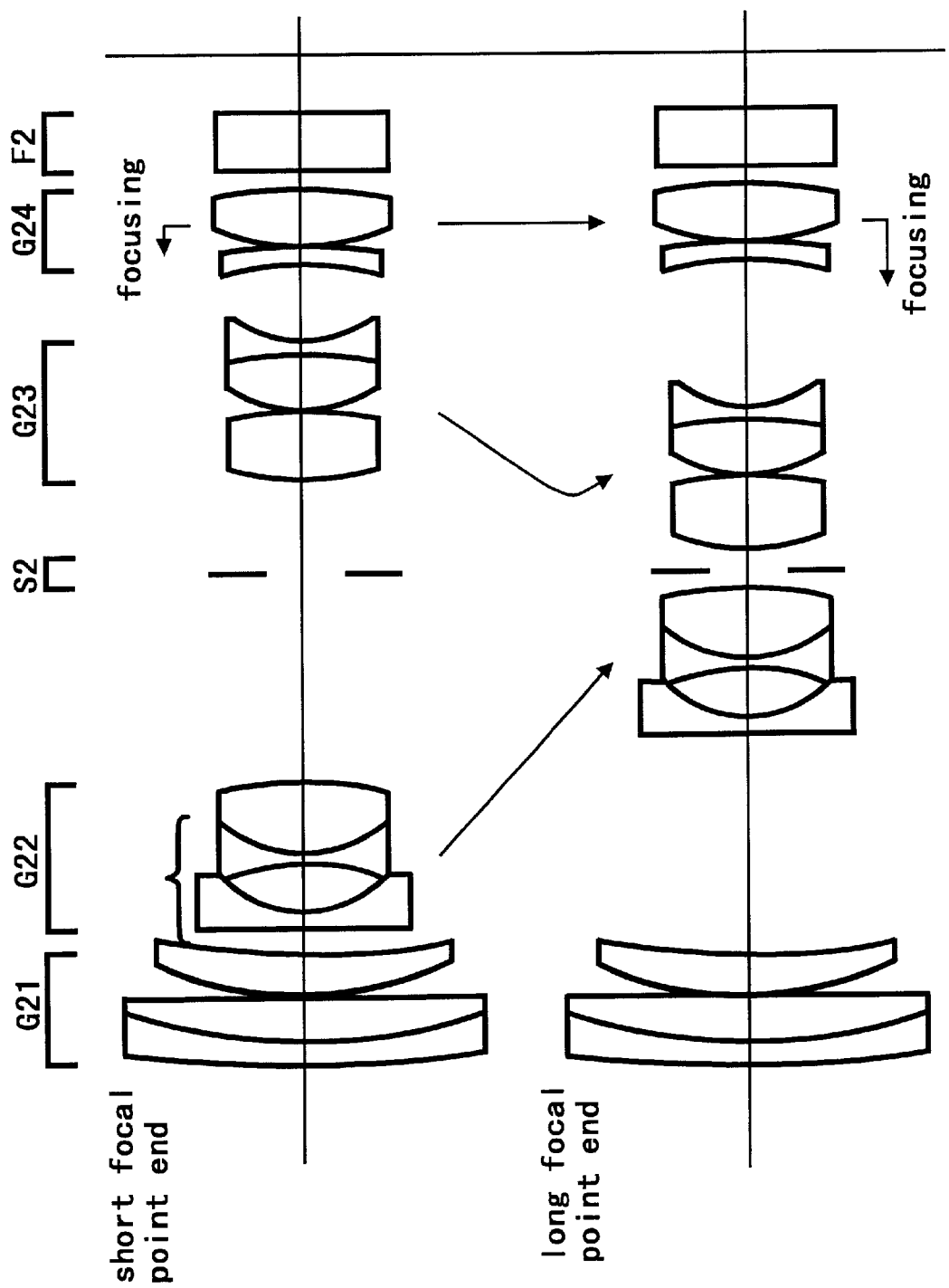
FIG. 22 is a diagram for explaining a construction and a movement of the lens groups of a zoom lens having a macro mode, according to another preferred embodiment of the present invention.
Figure 23:
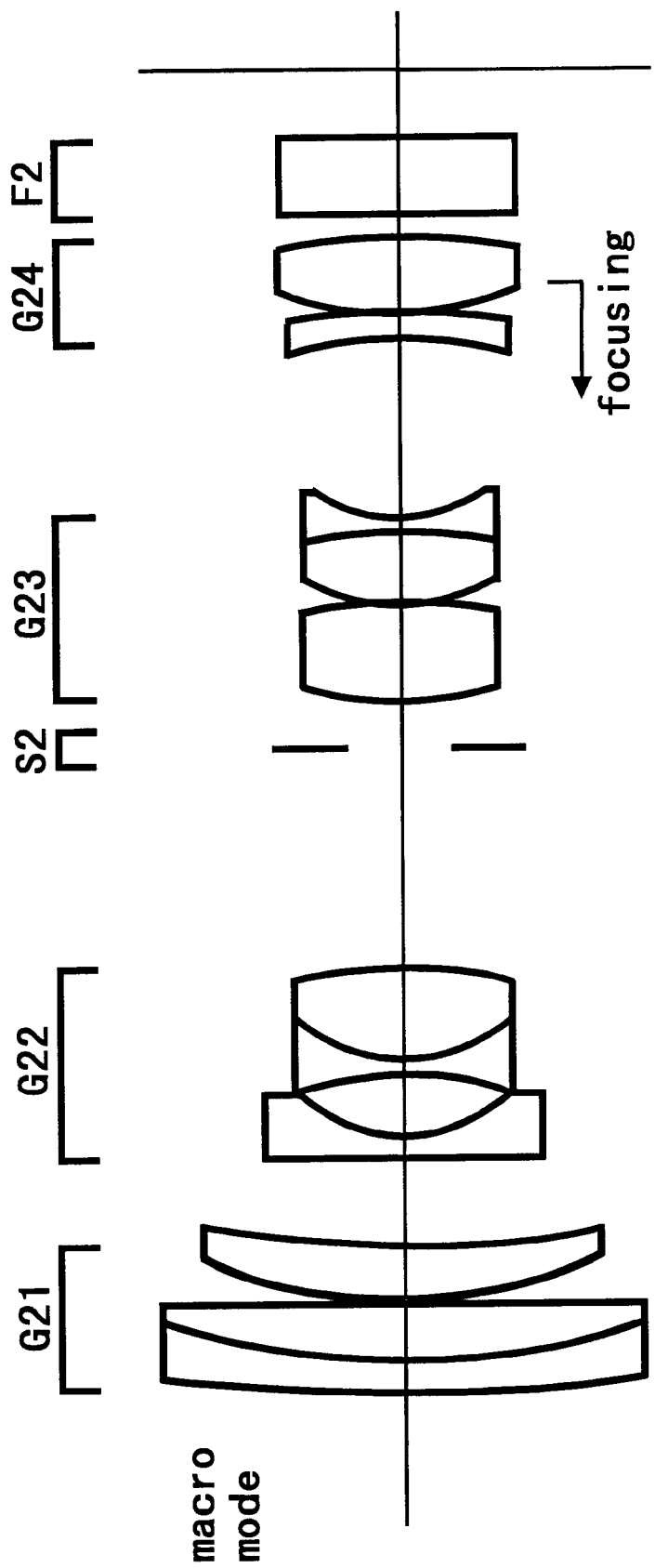
FIG. 23 is a cross section illustrating a construction of the zoom lens in the macro mode.

FIG. 22 is a diagram for explaining a construction of a zoom lens having a macro mode and a movement of the lens groups thereof, according to another preferred embodiment of the present invention. FIG. 23 is a diagram for explaining a construction of the zoom lens in the macro mode.

Figure 25:
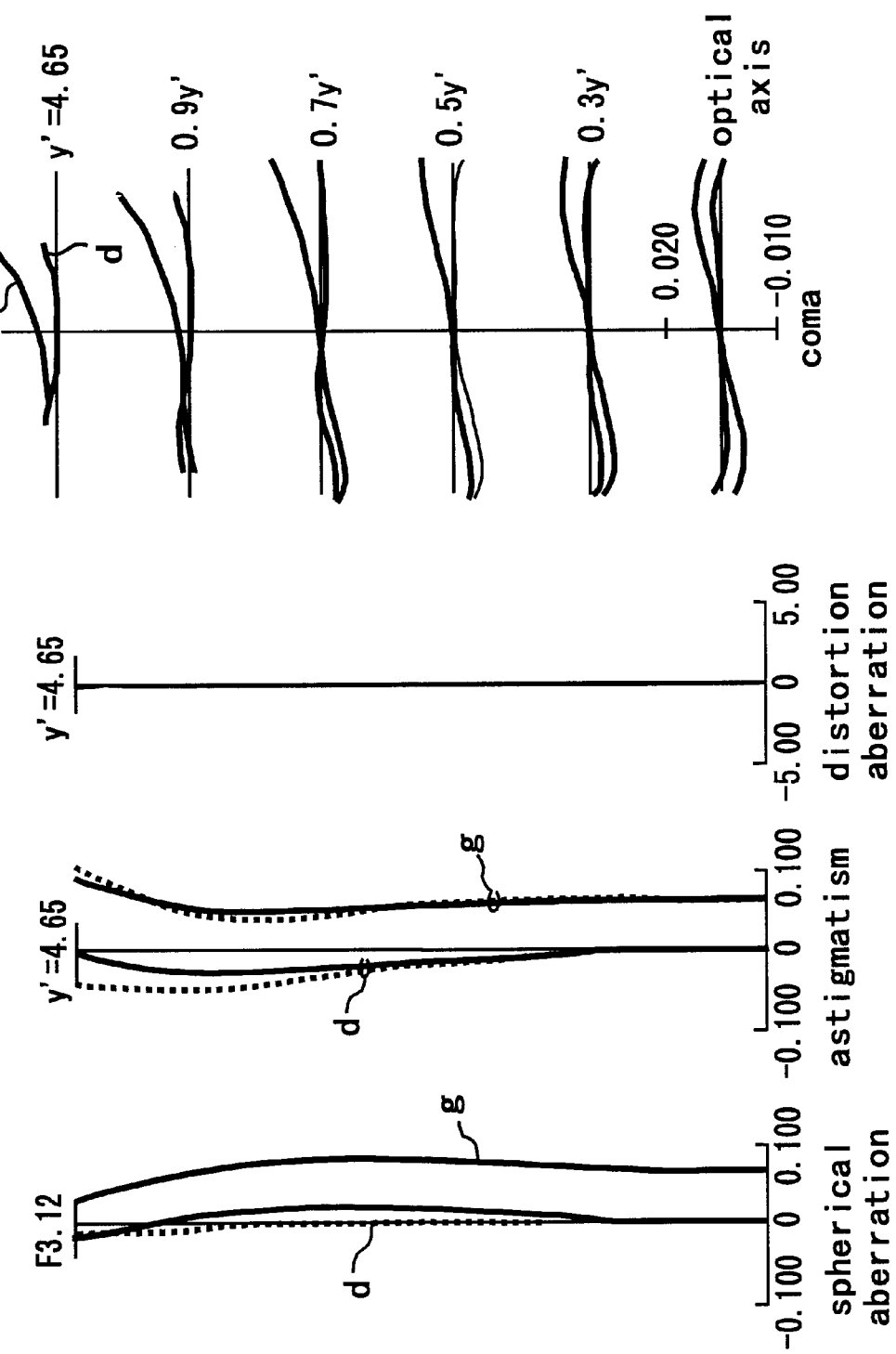
FIG. 25 is a diagram illustrating the aberration curve in an infinite distance at the intermediate focal point.
Figure 26:
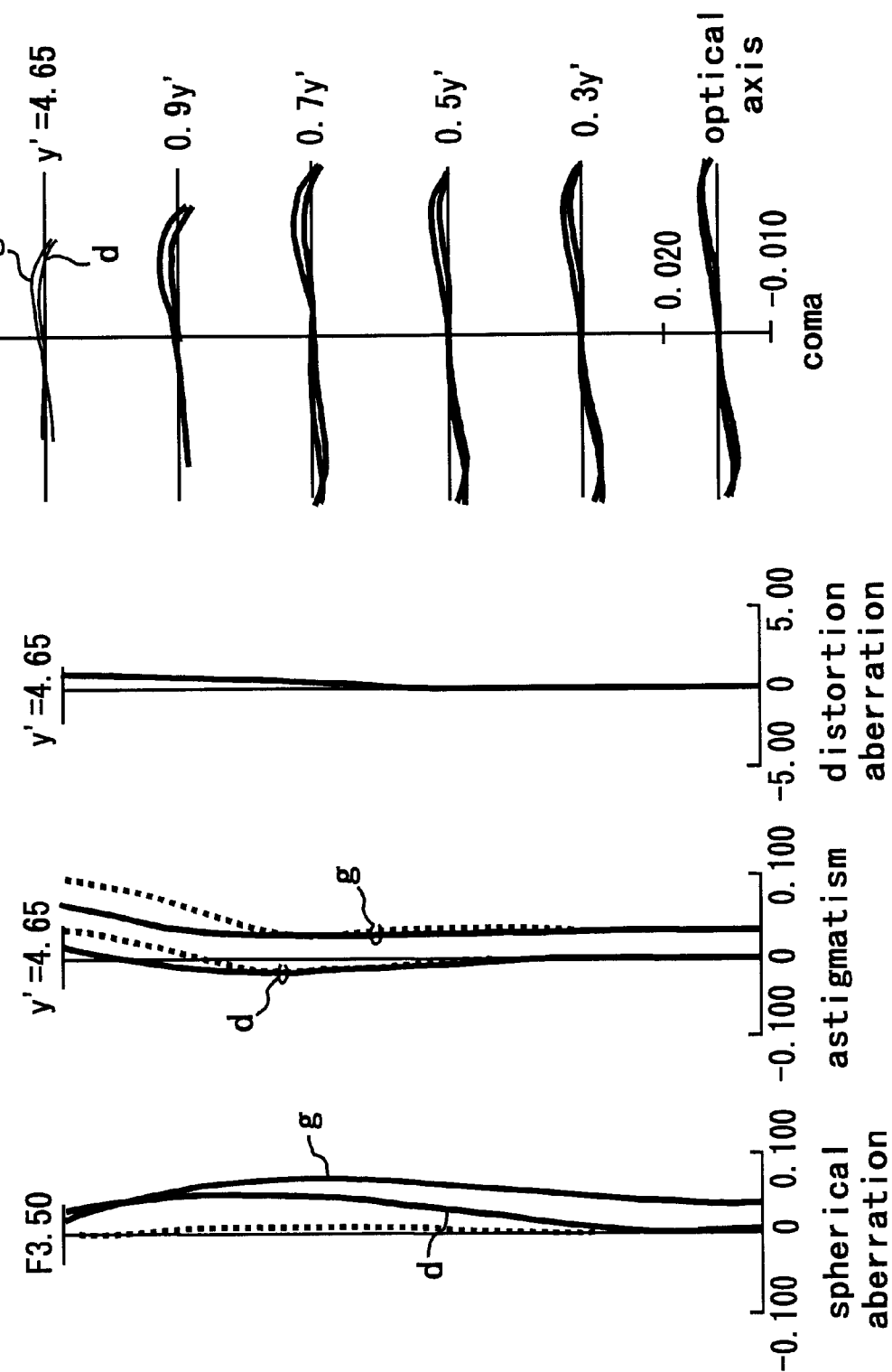
FIG. 26 is a diagram illustrating the aberration curve in an infinite distance at the long focal point end.
Figure 27:
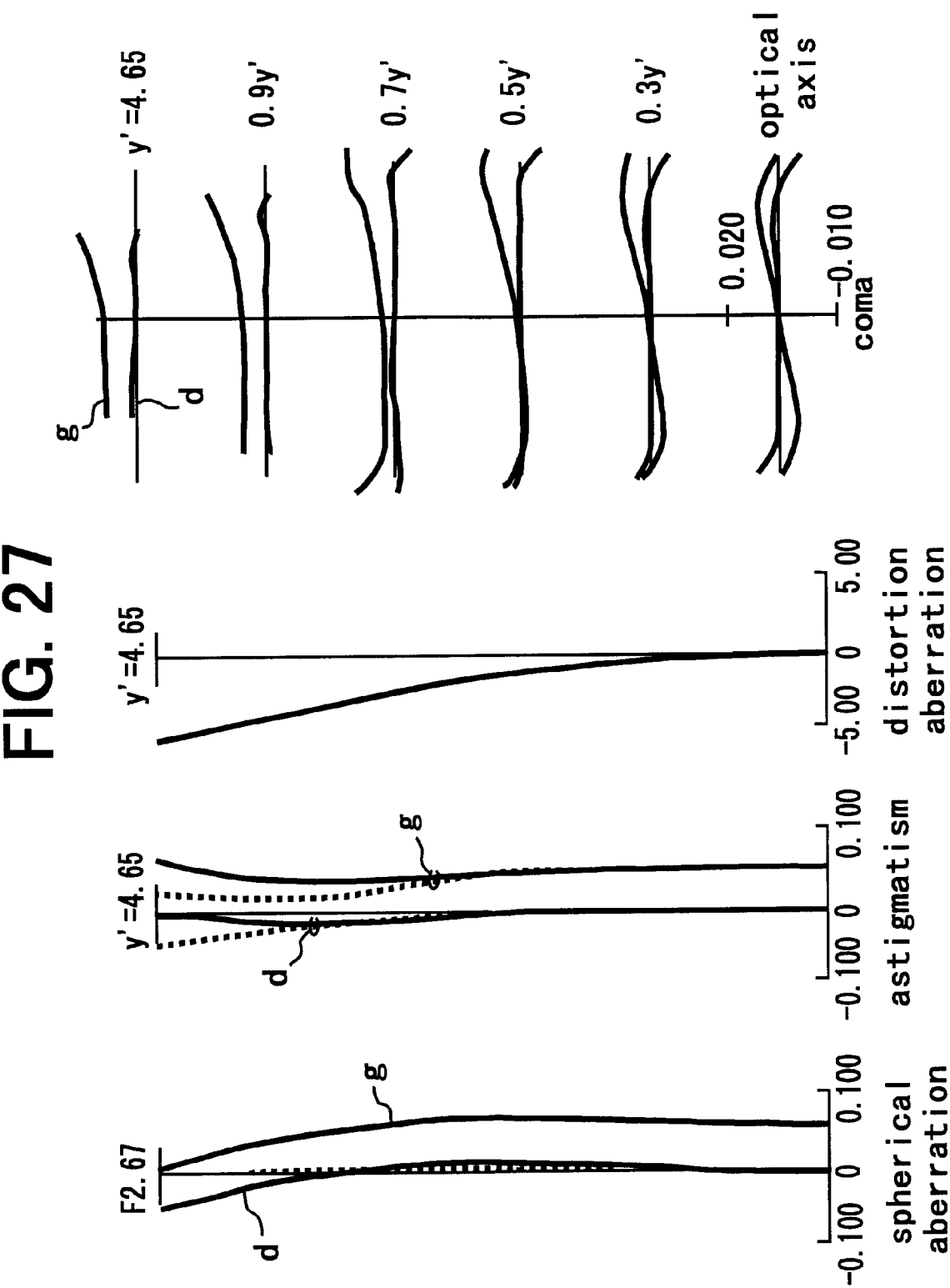
FIG. 27 is a diagram illustrating the aberration curve in the photographing distance of 0.3 mm at the short focal point end.
Figure 28:
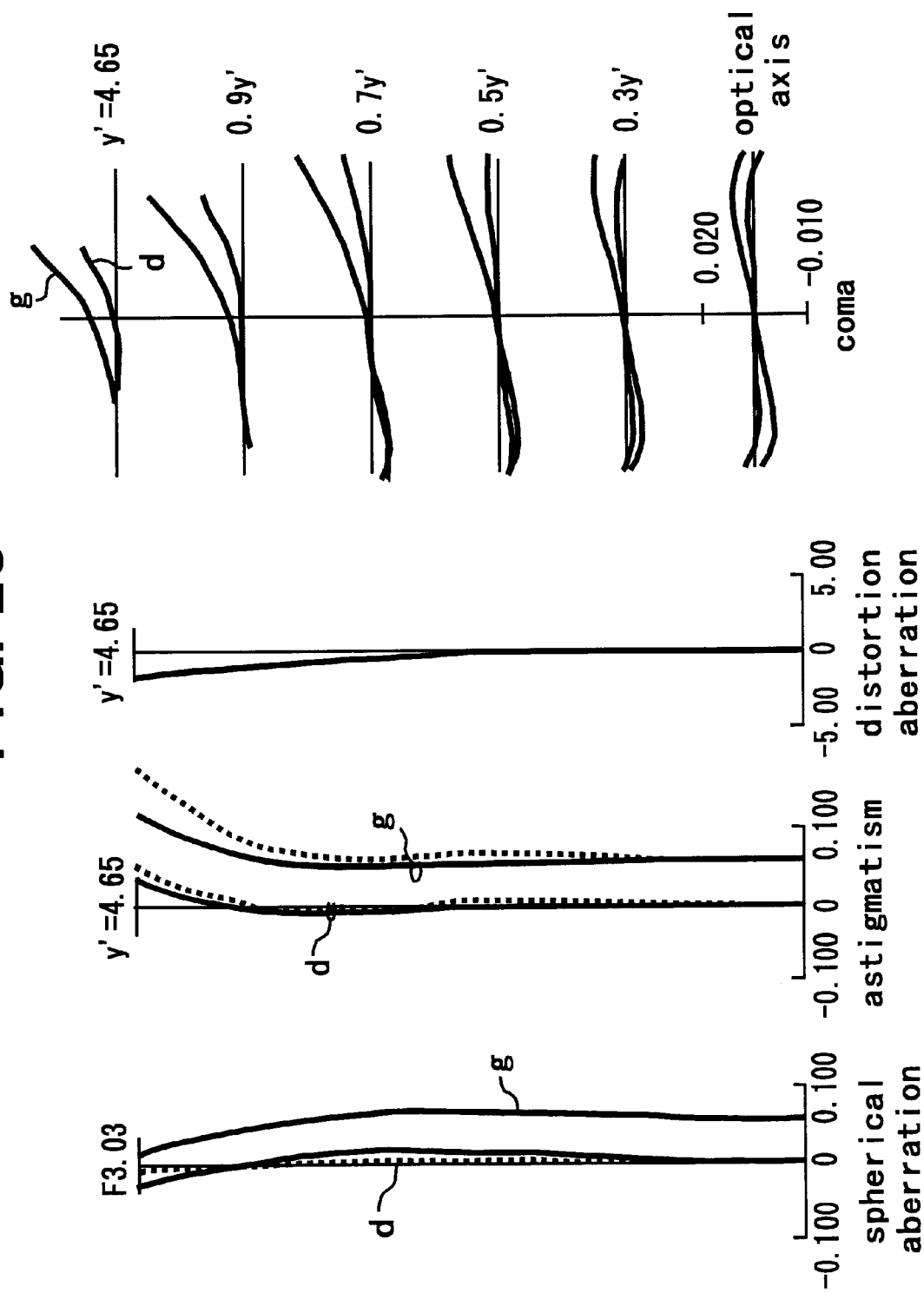
FIG. 28 is a diagram illustrating the aberration curve in the photographing distance of 0.3 mm at the intermediate focal point.
Figure 29:
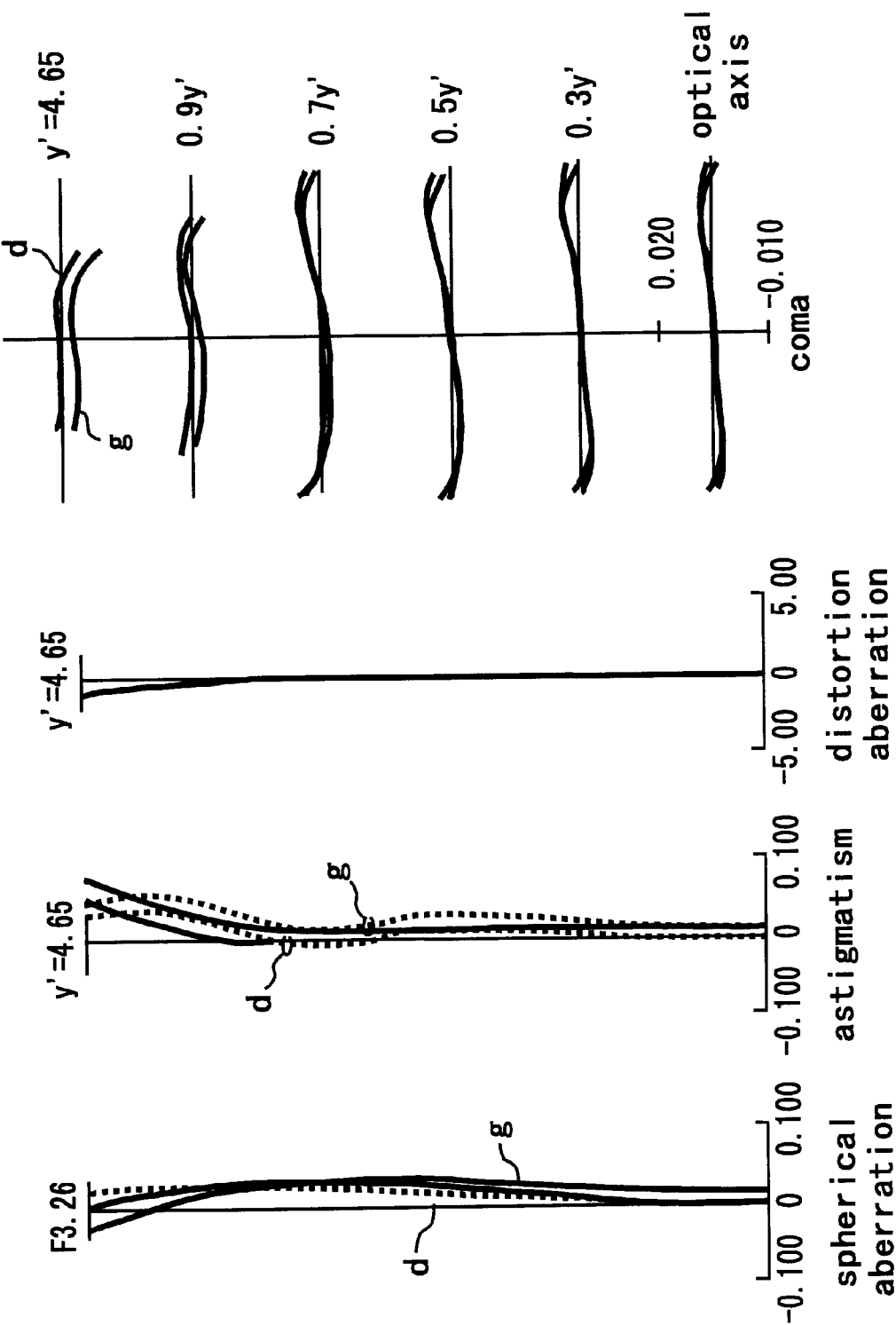
FIG. 29 is a diagram illustrating the aberration curve in the photographing distance of 0.3 mm at the long focal point end.
Figure 30:
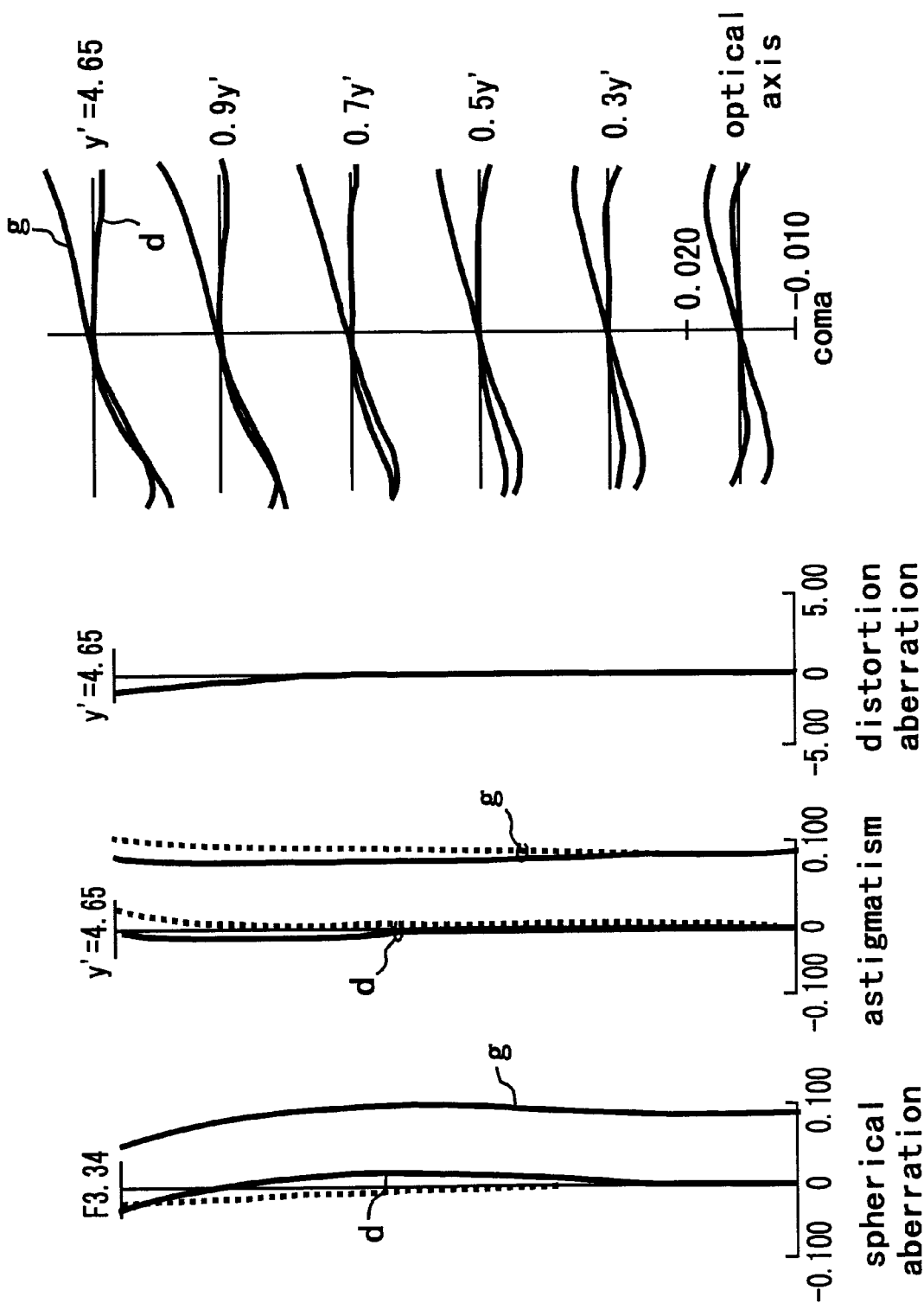
FIG. 30 is a diagram illustrating the aberration curve in the photographing distance of 0.3 mm in the macro mode.
Figure 31:
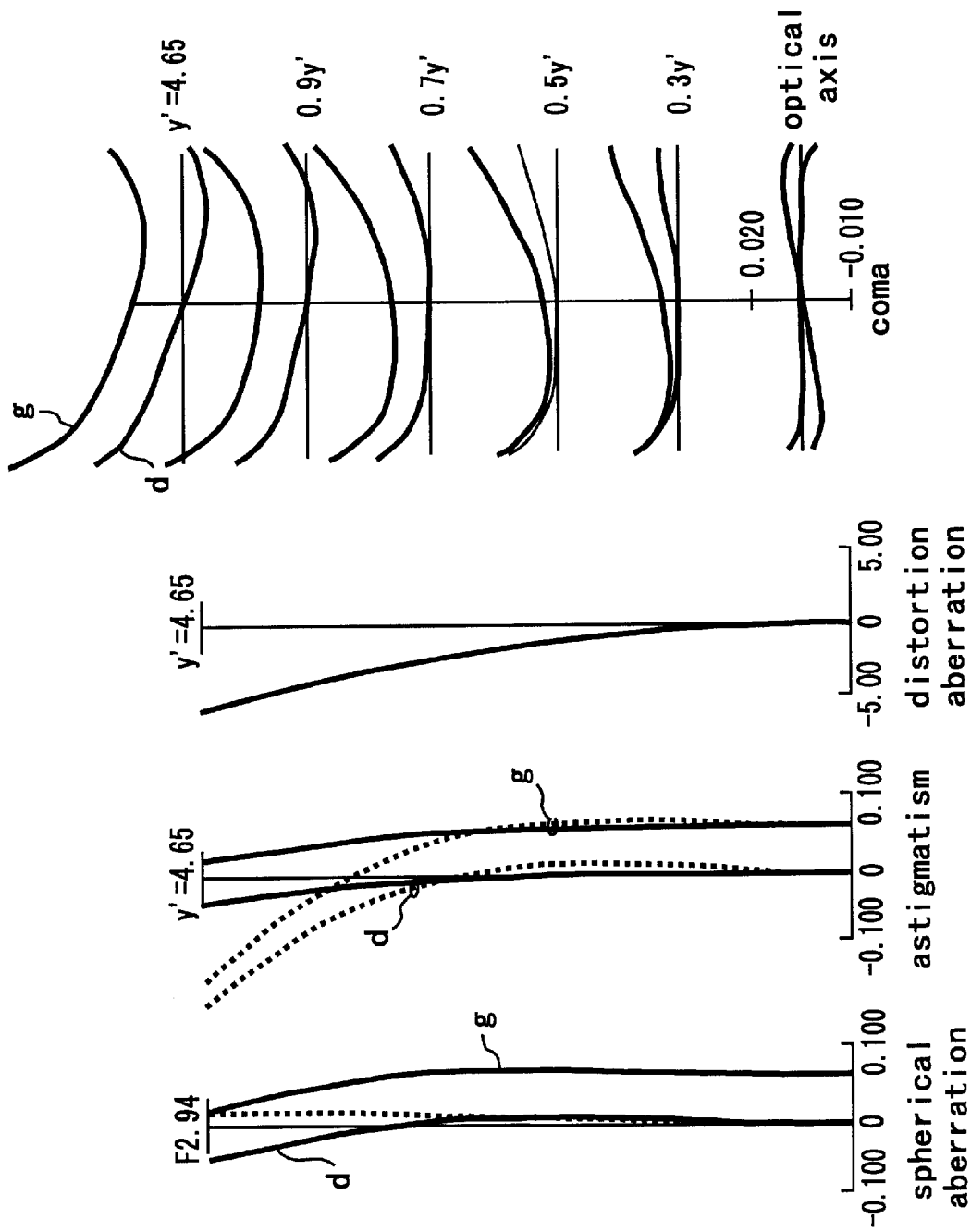
FIG. 31 is a diagram illustrating the aberration curve in the photographing distance of 0.074 mm in the macro mode.

FIG. 24 is a diagram illustrating the aberration curve of the zoom lens in an infinite distance at the short focal point end, FIG. 25 is a diagram illustrating the aberration curve in an infinite distance at the intermediate focal point, FIG. 26 is a diagram illustrating the aberration curve in an infinite distance at the long focal point end, FIG. 27 is a diagram illustrating the aberration curve in the photographing distance of 0.3 mm at the short focal point end, FIG. 28 is a diagram illustrating the aberration curve in the photographing distance of 0.3 mm at the intermediate focal point, FIG. 29 is a diagram illustrating the aberration curve in the photographing distance of 0.3 mm at the long focal point end, FIG. 30 is a diagram illustrating the aberration curve in the photographing distance of 0.3 mm in the macro mode and FIG. 31 is a diagram illustrating the aberration curve in the photographing distance of 0.074 mm in the macro mode.

In the diagrams of FIGS. 24–31, the spherical aberration, the astigmatism, the distortion aberration and the coma are respectively illustrated. A dotted line in the diagrams illustrating the spherical aberration indicates the aberration under the sine condition, and a solid line in the diagrams illustrating the astigmatism indicates the one in the sagittal plane and a dotted line the one in the meridional plane.

As illustrated in FIGS. 22 and 23, the zoom lens includes a first lens group G21 having a positive focal length, a second lens group G22 having a negative focal length, an opening iris S2, a third lens group G23, a fourth lens group G24 having a positive focal length and a flat plate F2 including filters, that are arranged on an optical axis in order from the object side.

The first lens group G21 includes three pieces of lenses, first through third lenses, the second lens group G22 includes three pieces of lenses, fourth through sixth lenses, the third lens group G23 includes three pieces of lenses, seventh through ninth lenses, and fourth lens group G24 includes two pieces of lenses, tenth through twelfth lenses. The first lens group G21 and the opening iris S2 are always fixed relative to the image plane.

As illustrated in the upper portion of FIG. 22, focusing at a short focal point end is achieved by a movement of the fourth lens group G24. Also, as illustrated in the lower portion of FIG. 22, focusing at a long focal point end is also achieved by a movement of the fourth lens group G24. When zooming from the short focal point end toward the long focal point end, as indicated by an arrow illustrated between the upper portion and the lower portion of FIG. 22, the second lens group G22 monotonously moves from the object side toward the image side. The third lens group G23, however, first moves from the image side toward the object side, and then, after arriving at a position closest to the object side in an area at the long focal point end side beyond the intermediate focal point, moves toward the image side.

Further, as illustrated in FIG. 23, also in the macro mode for focusing on a shorter distance than the normal photographing area, focusing is achieved by a movement of the fourth lens group G24 as in the focusing at the short and long focal point ends. The position of the second lens group G22 in the macro mode is made so as to be closer to the image plane than that at the short focal point end, which is illustrated in the upper portion of FIG. 22. Also, the third lens group G23 is disposed in the position that substantially coincides with the position of the third lens group G23 at the long focal point end, which is illustrated in the lower portion of FIG. 22.

Regarding the reference to "a normal photographing area", the intended meaning of the term "normal" is "standard", and the standard (normal) photographing area generally refers to a photographing area (from a shortest distance to an infinite distance) a zoom lens can focus at in a standard operation. Generally, the normal photographing area of a lens is specified in a brochure of the lens so as to be known to a user. When zooming, a plurality of lens group of the zoom lens are disposed in a (first) positional relationship.

A macro mode is provided, as an additional feature of the zoom lens, for enabling focusing at a shorter distance, that is shorter than the shortest distance in the normal photographing area (the shortest distance that can be focused at when the plurality of lens groups are disposed in the first positional relationship). In the macro mode, the plurality of lens groups are disposed in another (a second) positional relationship, that is different from the first positional relationship, for realizing focusing at the shorter distance.

Generally, in this type of zoom lens, focusing in the normal photographing area is achieved by a movement of the fourth lens group G24. However, in order to reduce the size of a lens system, particularly to shorten the entire length of the lens system, the interval between the third and fourth lens groups G23, G24 is required to be made small. Therefore, the moving distance for the fourth lens group G24 is restricted, so that it is difficult to make the shortest photographing distance excessively short. For example, focusing on an object at the tip end of the lens is difficult.

Therefore, in the zoom lens according to the above preferred embodiment, in the macro mode, the second and third lens groups G22, G23 are disposed in a positional relationship that is different from their positional relationships when zooming, and thereby focusing on a shorter distance than the normal photographing area is made possible.

Further, when focusing from a shortest distance in the normal photographing area to a shorter distance (a shortest distance in the macro mode), the fourth lens group G24 is moved as when focusing in the normal photographing area. By thus configuring the zoom lens so that both focusing in the normal photographing area and focusing in the macro mode are achieved by a movement of the fourth lens group G24, the lens group that is driven by a focusing signal from a distance measuring device is limited to only one lens group, thereby simplifying the mechanism for focusing.

Further, when zooming from the short focal point end toward the long focal point end, the third lens group G23 first moves from the image side toward the object side, and then, after arriving at a position closest to the object side in an area at the long focal point end side beyond the intermediate focal point, moves toward the image side. Thereby, the fourth lens group G24 when focusing is achieved on an infinite distance can be fixed in a constant position, thus facilitating the adjustment of the second and third lens groups G22, G23 when the zoom lens is assembled.

As described above, in the above zoom lens having a macro mode according to the preferred embodiment of the present invention, the position of the third lens groups G23 in the macro mode is made so as to substantially coincide with that of the third lens group G23 at the long focal point end. Generally, when focusing is achieved by a movement of the fourth lens group G24, the height of a light passing the third lens group G23 increases as focusing is achieved on a closer distance and thereby the peripheral light is lost at the third lens group G23, causing a deficiency in the peripheral light quantity. On the other hand, in order to secure a sufficient peripheral light quantity, the third lens group G23 must be large. The third lens group G23 is closest to the opening iris S2 at the long focal point end, where the quantity of the peripheral light which is lost at the third lens group G23 is least. Therefore, by making the position of the third lens group G23 in the macro mode in a vicinity of the opening iris S2 as at the long focal point end, even when the focusing is made on a shorter distance by a movement of the fourth lens group G24, the loss of the peripheral light at the third lens group G23 is suppressed to a minimum, and thereby the deficiency of the peripheral light and the large size of the third lens group G23 are avoided.

Further, as described above, the position of the second lens group G22 in the macro mode is preferably closer to the image plane than that at the short focal point end.

In the zoom lens configured according to the above preferred embodiment, a large negative distortion aberration tends to be generated at the short focal point end, and when focusing is achieved by a movement of the fourth lens group G24, the distortion aberration tends to be larger as focusing is achieved on a closer distance. This is because the second lens group G22 comes closest to the first lens group G21, thereby causing a strong negative power far from the opening iris S2 at the object side. Also in the macro mode, when the second lens group G22 and the first lens groups G21 are close to each other, a large negative power likewise tends to be generated. Accordingly, in this embodiment, in the macro mode, the position of the second lens group G22 is made far from the first lens group G21 to a certain extent, and thereby the negative distortion aberration is suppressed.

Thus, by arranging the second and third lens groups G22, G23 as above in the macro mode, the focal length in the macro mode is longer than at the short focal point end and is shorter than at the long focal point end in zooming. Therefore, by making the shortest photographing distance in the macro mode shorter than the shortest photographing distance in the normal photographing area, the magnification which can be realized is prevented from having a discontinuous portion.

For realizing the zoom lens having a macro mode according to the above preferred embodiment with a simpler mechanism, the first lens group G21 is preferably always fixed relative to the image plane. In the above embodiment, even when switching from the normal photographing area to the macro mode, the first lens group G21 is not required to move. Therefore, the first group lenses G21, which is the largest and heaviest one of the lens groups, can be always fixed relative to the image plane. Thus, the number of actuators used for moving the lens groups and the torque of the actuators are suppressed, which is advantageous in reducing the cost of the zoom lens and in reducing the power consumption.

For realizing the zoom lens with a further simpler mechanism, the opening iris S2 may be also always fixed relative to the image plane. This is because a shutter is generally provided at the position of the opening iris S2 and moving the shutter complicates the mechanism of the zoom lens, which is not desirable. Further, if the shutter is configured so as to move, a vibration which is generated when the shutter is operated tends to be transmitted to the other parts of the lens unit, which causes blurring of an image. Therefore, by configuring the opening iris S2 so as to be always fixed relative to the image plane, the mechanism is simplified and at the same time an image blur caused by a vibration of the shutter is avoided.

Furthermore, for further reducing the size of the zoom lens according to the above preferred embodiment, the interval between the third and fourth lens groups G23, G24 when focusing is achieved on an infinite distance is so made to be smallest at the short focal point end. As described above, for realizing a small size in the lens system of a zoom lens having a macro mode, the interval between the third and fourth lens groups G23, G24 is preferably short and the moving distance of the fourth lens group G24 for focusing is preferably limited. In particular, the effect on reducing the size of the lens system, particularly on shortening the entire length of the lens system, is large when the interval between the third and fourth lens groups G23, G24 when focusing is achieved on an infinite distance is shortest at the short focal point end. When focusing on a same distance, the moving distance (of the fourth lens group G24) for focusing is smaller as the focal length is shorter. Therefore, from the view point of moving distance for focusing, the short focal point end is most advantageous in focusing on a shorter distance. However, when the interval between the third and fourth lens groups G23, G24 is shortest at the short focal point end, even at the short focal point end, reduction of the shortest photographing length is extremely difficult.

The zoom lens according to the above preferred embodiment may be further configured such that a condition, $f_{12T}/f_1 < -1$, is satisfied, wherein $f_{12T}/f_1 < -1$ is the magnification of the second lens group G22 at the long focal point end. For reducing the size of a lens system, the power of the first lens group G21 must be increased (the focal length must be shortened). Therefore, the magnification of the second lens group G22 is preferably made smaller that $-1$. In this case, focusing through movement of the second lens group G22 can not be achieved, because, if the second lens group G22 is moved near the image plane for focusing, the second lens group G22 interferes with the opening iris S2. However, this problem can be avoided by using the macro mode.

A concrete example of a zoom lens according to the above preferred embodiment of the present invention is described herein below.

The symbol f represents the focal length of the entire optical system, F/No. represents the F number, represents the half image angle, R represents the radius of curvature, D represent the interval between lens surfaces, $N_d$ represents the refractive index, $_d$ represents the Abbe number, K represents the cone constant for a non-spherical surface, and $A_4$ represents the fourth degree coefficient, $A_6$ represents the sixth degree coefficient, $A_8$ represents the eighth degree coefficient, $A_{10}$ represents the tenth degree coefficient for the non-spherical surface, respectively.

The shape of a non-spherical surface is defined by giving the cone constant, K, the coefficients, $A_4$, $A_6$, $A_8$, $A_{10}$, and the inverse number of a paraxial radius of curvature, C(1/R) to a known formula, $X = CH^2/[1+\sqrt{1-(1+K)C^2H^2}] + A_4H^4 + A_6H^6 + A_8H^8 + A_{10}H^{10}$, wherein H represents the height from the optical axis and X represents an amount of a change in the optical axial direction.

EXAMPLE 6 f=7.52~21.23, F/No.=2.70~3.50, ω=33.212.2

| surface number | R | D | $N_d$ | $v_d$ | note |
|---|---|---|---|---|---|
| 01 | 123.000 | 1.400 | 1.84666 | 23.78 | first lens |
| 02 | 39.977 | 2.600 | 1.77250 | 49.62 | second lens |
| 03 | ∞ | 0.100 | | | |
| 04 | 22.002 | 2.330 | 1.77250 | 49.62 | third lens |
| 05 | 49.500 | variable (A) | | | |
| 06* | 1000.000 | 0.030 | 1.50703 | 53.43 | |
| 07 | 162.601 | 0.970 | 1.80610 | 40.73 | fourth lens |
| 08 | 6.689 | 2.870 | | | |
| 09 | −17.299 | 0.800 | 1.60311 | 60.69 | fifih lens |
| 10 | 8.203 | 4.120 | 1.83400 | 37.34 | sixth lens |
| 11 | −28.590 | variable (B) | | | |
| 12 | iris | variable (C) | | | |
| 13** | 12.249 | 0.030 | 1.50703 | 53.43 | |
| 14 | 13.210 | 4.440 | 1.58913 | 61.25 | seventh lens |
| 15 | −19.759 | 0.100 | | | |
| 16 | 12.150 | 3.060 | 1.77250 | 49.62 | eighth lens |
| 17 | −47.804 | 0.800 | 1.80518 | 25.46 | ninth lens |
| 18 | 7.200 | variable (D) | | | |
| 19 | −22.913 | 1.000 | 1.62004 | 36.30 | tenth lens |

-continued

| surface number | R | D | $N_d$ | $v_d$ | note |
|---|---|---|---|---|---|
| 20 | −273.270 | 0.100 | | | |
| 21 | 14.061 | 3.340 | 1.74330 | 49.22 | eleventh lens |
| 22 | −36.932 | 0.100 | 1.50703 | 53.43 | |
| 23*** | −25.189 | arbitrary | | | |
| 24 | ∞ | 3.332 | 1.51680 | 64.20 | filters |
| 25 | ∞ | | | | |

In the above, the surface number having the mark (*) indicates that the corresponding surface is non-spherical and the cone constant and the coefficients are follows:
*the non-spherical surface: sixth surface
$K = 0.0$, $A_4 = 8.76330 \times 10^{-5}$, $A_6 = -1.00557 \times 10^{-6}$, $A_8 = 8.70046 \times 10^{-9}$, $A_{10} = -4.65380 \times 10^{-11}$;
**the non-spherical surface: thirteenth surface
$K = -4.77319$, $A_4 = 1.29390 \times 10^{-4}$, $A_6 = -1.30660 \times 10^{-7}$, $A_8 = -1.21202 \times 10^{-7}$, $A_{10} = 3.23950 \times 10^{-9}$; and
***the non-spherical surface: twenty-third surface
$K = 3.43729$, $A_4 = 2.78810 \times 10^{-4}$, $A_6 = -1.81528 \times 10^{-6}$, $A_8 = 3.16416 \times 10^{-8}$, $A_{10} = -4.87685 \times 10^{-10}$.

The variable amounts in the normal photographing area are as follows:

| | infinite distance short focal point end f = 7.52 | infinite distance intermediate focal point f = 12.50 | infinite distance long focal point end f = 21.33 |
|---|---|---|---|
| A | 1.400 | 7.250 | 13.100 |
| B | 12.800 | 6.950 | 1.100 |
| C | 5.498 | 3.155 | 1.335 |
| D | 4.552 | 6.895 | 8.715 |

| | 0.3 mm short focal point end f = 7.43 | 0.3 mm intermediate focal point f = 12.15 | 0.3 mm long focal point end f = 19.87 |
|---|---|---|---|
| A | 1.400 | 7.250 | 13.100 |
| B | 12.800 | 6.950 | 1.100 |
| C | 5.498 | 3.155 | 1.335 |
| D | 4.212 | 6.028 | 6.522 |

The variable amounts in the macro mode are as follows:

| | 0.3 mm f = 10.89 | 0.074 mm f = 10.35 |
|---|---|---|
| A | 4.050 | 4.050 |
| B | 10.150 | 10.150 |
| C | 2.080 | 2.080 |
| D | 8.126 | 4.306 |

The numerical value of the condition is as follows:

$(f_{12T}/f_1) = -1.073$.

As apparent from FIGS. 24–31, the aberration is sufficiently corrected in the normal photographing area and in the macro mode as well, and the zoom lens according to the above embodiment can be compatible with a light receiving element having a resolution of more than 3 million pixels. That is, the good image forming performance can be realized by the zoom lens having a macro mode that is configured as described above according to the above preferred embodiment. Further, a sufficient magnification, such as 0.3 times, can be obtained at a very short photographing distance, such as 0.074 m from the image plane, and can be accomplished in the macro mode.

Numerous additional modifications and variations of the present invention are possible in light of the above teachings. It is therefore to be understood that within the scope of the appended claims, the present invention may be practiced otherwise than as specifically described herein.

The present application claims priority and contains subject matter related to Japanese Patent Application No. 11-232663 filed in the Japanese Patent Office on Aug. 19, 1999, and the entire contents of which are hereby incorporated by reference.

What is claimed as new and is desired to be secured by Letter Patent of the United State is:

1. A zoom lens, comprising:
   a first lens group having a positive focal length;
   a second lens group having a negative focal length;
   an opening iris;
   a third lens group having a positive focal length; and
   a fourth lens group having a positive focal length,
   wherein the first lens group, the second lens group, the opening iris, the third lens group and the fourth lens group are arranged in order from an object side, and
   wherein the zoom lens is configured such that, when zooming from a short focal point end toward a long focal point end, the second lens group moves from an object side toward an image side, and the third lens group first moves from the image side toward the object side and then, after arriving at a position closest to the object side in an area at a long focal point side beyond an intermediate focal point, moves toward the image side so as to be disposed in a first positional relationship.

2. The zoom lens of claim 1, wherein the fourth lens group is fixed when zooming.

3. The zoom lens of claim 1, wherein the opening iris is mounted at a fixed position.

4. The zoom lens of claim 1, wherein the first lens group is mounted at a fixed position.

5. The zoom lens of claim 1, wherein focusing of the zoom lens is achieved by movement of the fourth lens group.

6. The zoom lens of claim 1, wherein a focal length of the first lens group, $f_1$, and a synthesized focal length of the first lens group and the second lens group at the long focal point end, $f_{12T}$, satisfy a condition: $-1.2 < (f_{12T}/f_1) < -1.0$.

7. The zoom lens of claim 1, wherein each of the first, second, third, and fourth lens groups includes less than four lenses and each of the second, third and fourth lens groups includes at least one non-spherical surface.

8. The zoom lens of claim 3, wherein a synthesized focal length of the first lens group and the second lens group at the long focal point end, $f_{12T}$, a synthesized focal length of the first lens group and the second lens group at the short focal point end, $f_{12W}$, a synthesized focal length of the first lens group through the third lens group at the long focal point end, $f_{123T}$, and a synthesized focal length of the first lens group through the third lens group at the short focal point end, $f_{123W}$ satisfy a condition: $1.3 < (f_{123T}/f_{12T})/(f_{123W}/f_{12W}) < 1.5$.

9. The zoom lens of claim 4, wherein a synthesized focal length of the first lens group and the second lens group at the long focal point end, $f_{12T}$, a synthesized focal length of the first lens group and the second lens group at the short focal point end, $f_{12W}$, a synthesized focal length of the first lens group through the third lens group at the long focal point end, $f_{123T}$, and a synthesized focal length of the first lens group through the third lens group at the short focal point end, $f_{123W}$ satisfy a condition: $1.3 < (f_{123T}/f_{12T})/(f_{123W}/f_{12W}) < 1.5$.

10. The zoom lens of claim 5, wherein a synthesized focal length of the first lens group and the second lens group at the long focal point end, $f_{12T}$, a synthesized focal length of the first lens group and the second lens group at the short focal point end, $f_{12W}$, a synthesized focal length of the first lens group through the third lens group at the long focal point end, $f_{123T}$, and a synthesized focal length of the first lens group through the third lens group at the short focal point end, $f_{123W}$ satisfy a condition: $1.3<(f_{123T}/f_{12T})/(f_{123W}/f_{12W})<1.5$.

11. The zoom lens of claim 6, wherein a synthesized focal length of the first lens group and the second lens group at the long focal point end, $f_{12T}$, a synthesized focal length of the first lens group and the second lens group at the short focal point end, $f_{12W}$, a synthesized focal length of the first lens group through the third lens group at the long focal point end, $f_{123T}$, and a synthesized focal length of the first lens group through the third lens group at the short focal point end, $f_{123W}$ satisfy a condition: $1.3<(f_{123T}/f_{12T})/(f_{123W}/f_{12W})<1.5$.

12. The zoom lens of claim 1, further comprising:
a macro mode in which the second and third lens groups are disposed in a second positional relationship that is different from the first positional relationship, when zooming,
wherein focusing in the macro mode is achieved by movement of the fourth lens group.

13. The zoom lens of claim 12, wherein a position of the third lens group in the macro mode substantially coincides with a position of the third lens group at the long focal point end.

14. The zoom lens of claim 12, wherein a position of the second lens group is closer to an image plane than a position of the second lens group at the short focal point end.

15. The zoom lens of claim 12, wherein an interval between the third and fourth lens groups when focusing is achieved on an infinite distance is shortest at the short focal point end.

16. The zoom lens of claim 12, wherein a condition, $f_{12T}/f_1<-1$, is satisfied when $f_1$ is a focal length of the first lens group and $f_{12T}$ is a synthesized focal length of the first and second lens groups at the long focal point end.

17. A camera, comprising a camera body and a zoom lens connected to the camera body, the zoom lens including:
a first lens group having a positive focal length;
a second lens group having a negative focal length; an opening iris;
a third lens group having a positive focal length; and
a fourth lens group having a positive focal length,
wherein the first lens group, the second lens group, the opening iris, the third lens group and the fourth lens group are arranged in order from an object side, and
wherein the zoom lens is configured such that, when zooming from a short focal point end toward a long focal point end, the second lens group moves from an object side toward an image side, and the third lens group first moves from the image side toward the object side and then, after arriving at a position closest to the object side in an area at a long focal point side beyond an intermediate focal point, moves toward the image side.

18. The camera of claim 17, wherein the zoom lens is detachably connected to the camera body.

* * * * *